United States Patent
Dean

(10) Patent No.: US 8,665,774 B2
(45) Date of Patent: Mar. 4, 2014

(54) REVERSE LINK POWER-CONTROLLED REPEATER

(75) Inventor: Richard F. Dean, Lyons, CO (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 13/083,107

(22) Filed: Apr. 8, 2011

(65) Prior Publication Data

US 2011/0305172 A1  Dec. 15, 2011

Related U.S. Application Data

(63) Continuation of application No. 10/300,969, filed on Nov. 20, 2002, now Pat. No. 7,924,751.

(60) Provisional application No. 60/331,943, filed on Nov. 20, 2001.

(51) Int. Cl.
*H04B 7/14* (2006.01)

(52) U.S. Cl.
USPC .......................................... 370/315; 370/492

(58) Field of Classification Search
None
See application file for complete search history.

(56) References Cited

U.S. PATENT DOCUMENTS

| | | |
|---|---|---|
| 3,670,249 A | 6/1972 | Meslener |
| 4,723,320 A | 2/1988 | Horton |
| 4,901,307 A | 2/1990 | Gilhousen et al. |
| 4,993,021 A | 2/1991 | Nannicini et al. |
| 5,056,109 A | 10/1991 | Gilhousen et al. |
| 5,103,459 A | 4/1992 | Gilhousen et al. |
| 5,210,632 A | 5/1993 | Murakami et al. |
| 5,355,511 A | 10/1994 | Hatano et al. |
| 5,383,219 A | 1/1995 | Wheatley, III et al. |
| 5,396,516 A | 3/1995 | Padovani et al. |
| 5,416,468 A | 5/1995 | Baumann |
| 5,440,418 A | 8/1995 | Ishimura et al. |
| 5,507,452 A | 4/1996 | Mayersak |
| 5,608,393 A | 3/1997 | Hartman |

(Continued)

FOREIGN PATENT DOCUMENTS

| | | |
|---|---|---|
| EP | 0588598 A1 | 3/1994 |
| EP | 0651360 A1 | 5/1995 |

(Continued)

OTHER PUBLICATIONS

Bavafa, et al., Repeaters for CDMA Systems, 48th IEEE Vehicular Technology Conference, 1998, VTC 98, May 18-21, 1998, vol. 2, pp. 1161-1165.

(Continued)

*Primary Examiner* — Chirag Shah
*Assistant Examiner* — Jenkey Van
(74) *Attorney, Agent, or Firm* — Thien T. Nguyen

(57) ABSTRACT

The invention provides a mechanism for automatically setting reverse link gain or power for a repeater (120) used in a communication system (100) through the use of the reverse link power control of a built-in wireless communications device. By embedding a wireless communication device (430, 630, 700) inside the repeater and injecting reverse link signals of the embedded device into the reverse link of the repeater (124A, 124B), the gain of the repeater is maintained relatively constant. The embedded WCD can also be activated on a periodic basis to make calls and utilize reverse link power-control to calibrate or re-calibrate the gain of the repeater, making it a power-controlled repeater.

24 Claims, 10 Drawing Sheets

(56) References Cited

U.S. PATENT DOCUMENTS

| | | | |
|---|---|---|---|
| 5,626,630 A | 5/1997 | Markowitz et al. | |
| 5,646,630 A | 7/1997 | Sheynblat et al. | |
| 5,812,933 A | 9/1998 | Niki | |
| 5,815,795 A * | 9/1998 | Iwai | 455/9 |
| 5,910,943 A | 6/1999 | Wickman | |
| 5,991,345 A | 11/1999 | Ramasastry | |
| 6,049,535 A | 4/2000 | Ozukturk et al. | |
| 6,052,558 A | 4/2000 | Cook et al. | |
| 6,108,364 A * | 8/2000 | Weaver et al. | 375/130 |
| 6,118,809 A | 9/2000 | Lo | |
| 6,147,981 A | 11/2000 | Prescott | |
| 6,185,429 B1 | 2/2001 | Gehrke et al. | |
| 6,188,719 B1 | 2/2001 | Collomby | |
| 6,266,008 B1 | 7/2001 | Huston et al. | |
| 6,272,316 B1 | 8/2001 | Wiedeman et al. | |
| 6,307,504 B1 | 10/2001 | Sheynblat | |
| 6,317,420 B1 | 11/2001 | Schiff | |
| 6,346,911 B1 | 2/2002 | King | |
| 6,347,216 B1 | 2/2002 | Marko et al. | |
| 6,349,211 B2 | 2/2002 | Koshima et al. | |
| 6,353,412 B1 | 3/2002 | Soliman | |
| 6,377,792 B1 | 4/2002 | Brown et al. | |
| 6,404,775 B1 | 6/2002 | Leslie et al. | |
| 6,415,155 B1 | 7/2002 | Koshima et al. | |
| 6,429,808 B1 | 8/2002 | King et al. | |
| 6,430,415 B1 | 8/2002 | Agashe et al. | |
| 6,501,955 B1 | 12/2002 | Durrant et al. | |
| 6,507,741 B1 | 1/2003 | Bassirat | |
| 6,515,975 B1 | 2/2003 | Chheda et al. | |
| 6,615,021 B1 | 9/2003 | Lovinggood et al. | |
| 6,690,657 B1 | 2/2004 | Lau et al. | |
| 6,757,263 B1 | 6/2004 | Olds | |
| 6,788,663 B2 | 9/2004 | Rowitch | |
| 6,889,033 B2 | 5/2005 | Bongfeldt | |
| 6,901,264 B2 | 5/2005 | Myr | |
| 6,901,268 B2 | 5/2005 | Chang | |
| 6,999,778 B2 | 2/2006 | DiBuduo | |
| 7,013,111 B2 | 3/2006 | Kuwahara et al. | |
| 7,020,436 B2 | 3/2006 | Schmutz | |
| 7,027,773 B1 | 4/2006 | McMillin | |
| 7,039,418 B2 | 5/2006 | Amerga et al. | |
| 7,058,400 B2 | 6/2006 | Brooks | |
| 7,062,224 B2 | 6/2006 | Baker et al. | |
| 7,068,973 B1 | 6/2006 | Lovinggood et al. | |
| 7,075,481 B2 | 7/2006 | Huston et al. | |
| 7,123,911 B1 | 10/2006 | Ngan | |
| 7,139,580 B2 | 11/2006 | Stein et al. | |
| 7,218,275 B2 | 5/2007 | Han | |
| 7,355,993 B2 | 4/2008 | Adkins et al. | |
| 7,457,584 B2 | 11/2008 | Baker et al. | |
| 7,526,247 B2 | 4/2009 | Baker et al. | |
| 7,590,383 B2 | 9/2009 | Dean et al. | |
| 7,778,596 B2 | 8/2010 | Anderson et al. | |
| 7,831,263 B2 | 11/2010 | Sheynblat et al. | |
| 7,881,249 B2 | 2/2011 | Wheatley | |
| 7,924,751 B2 | 4/2011 | Dean | |
| 8,320,825 B2 | 11/2012 | Goeransson et al. | |
| 2002/0028655 A1 * | 3/2002 | Rosener et al. | 455/16 |
| 2002/0045431 A1 * | 4/2002 | Bongfeldt | 455/234.1 |
| 2002/0160813 A1 | 10/2002 | Miya | |
| 2002/0167918 A1 | 11/2002 | Brewer | |
| 2003/0008663 A1 | 1/2003 | Stein et al. | |
| 2003/0023682 A1 | 1/2003 | Brown et al. | |
| 2003/0039267 A1 | 2/2003 | Koo et al. | |
| 2003/0076979 A1 | 4/2003 | Matsui | |
| 2003/0083008 A1 | 5/2003 | Baker et al. | |
| 2003/0086401 A1 | 5/2003 | Lee et al. | |
| 2003/0125045 A1 | 7/2003 | Riley et al. | |
| 2003/0151506 A1 | 8/2003 | Luccketti | |
| 2003/0193992 A1 | 10/2003 | Challa et al. | |
| 2004/0006696 A1 | 1/2004 | Shin et al. | |
| 2004/0012086 A1 | 1/2004 | Infantolino et al. | |
| 2004/0028003 A1 | 2/2004 | Diener et al. | |
| 2004/0073916 A1 | 4/2004 | Petrovic et al. | |
| 2004/0095733 A1 | 5/2004 | Cheng et al. | |
| 2004/0097190 A1 | 5/2004 | Durrant et al. | |
| 2004/0176026 A1 | 9/2004 | Gainey et al. | |
| 2004/0212518 A1 | 10/2004 | Tajima et al. | |
| 2006/0046642 A1 | 3/2006 | Bassiri et al. | |
| 2007/0052560 A1 | 3/2007 | Van Der Veen et al. | |
| 2008/0062906 A1 | 3/2008 | Baker et al. | |
| 2009/0053993 A1 | 2/2009 | Baker et al. | |

FOREIGN PATENT DOCUMENTS

| | | |
|---|---|---|
| EP | 0822674 A1 | 2/1998 |
| EP | 0840533 A2 | 5/1998 |
| EP | 0851695 A2 | 7/1998 |
| EP | 0924878 A2 | 6/1999 |
| EP | 0935356 A2 | 8/1999 |
| EP | 1093273 A1 | 4/2001 |
| EP | 1195920 A1 | 4/2002 |
| EP | 1207404 A1 | 5/2002 |
| GB | 2378614 A | 2/2003 |
| JP | 2000055492 A | 2/2000 |
| JP | 2000505251 T | 4/2000 |
| JP | 2001128208 A | 5/2001 |
| JP | 2001209891 A | 8/2001 |
| JP | 2004095791 | 3/2004 |
| KR | 20030082363 A | 10/2003 |
| KR | 20030088511 | 11/2003 |
| WO | 9613103 A1 | 5/1996 |
| WO | 9706648 A1 | 2/1997 |
| WO | 9732445 A1 | 9/1997 |
| WO | 9927747 A1 | 6/1999 |
| WO | 0064091 A2 | 10/2000 |
| WO | 0133302 | 5/2001 |
| WO | 0150635 | 7/2001 |
| WO | 0199444 A1 | 12/2001 |
| WO | 0217669 A1 | 2/2002 |
| WO | 0233996 A1 | 4/2002 |
| WO | 02059638 A2 | 8/2002 |
| WO | 02087275 A2 | 10/2002 |
| WO | 03036824 A1 | 5/2003 |
| WO | 03044970 A2 | 5/2003 |
| WO | 03061202 A1 | 7/2003 |
| WO | 03093859 A1 | 11/2003 |
| WO | 2004095733 | 11/2004 |

OTHER PUBLICATIONS

Simon, et al., "Spread Spectrum Communications Handbook," Revised Edition, McGraw-Hill, 1994, ISBN 0-07-057629-7, pp. 11-12.

Telecommunications Industry Association, Mobile Station-Base Station Compatibility Standard for Dual-Mode Wideband Spread Spectrum Cellular System, TIA/EIA 95, Jul. 1993, 668 pages.

TIA/EIA/IS-98-A; "Recommended Minimum Performance Standards for Dual-Mode Wideband Spread Spectrum Cellular Mobile Stations," Telecommunications Industry Association, Jul. 1996.

* cited by examiner

REVERSE LINK POWER-CONTROLLED REPEATER

CROSS-REFERENCE TO RELATED APPLICATION

This application claims the benefit of U.S. patent application Ser. No. 10/300,969, filed Nov. 20, 2002, which claims the benefit of U.S. Provisional Patent Application Ser. No. 60/331,943, filed Nov. 20, 2001, which both applications are incorporated herein by reference in their entirety.

BACKGROUND

I. Field of the Invention

The present invention relates generally to wireless communication systems, and more specifically, to a repeater for use in wireless communication systems having an embedded wireless communication device capable of interacting with base stations communicating with and through the repeater to affect control of repeater gain and output power.

II. Related Art

Wireless communication systems have developed a great deal in recent years and enjoy widespread use. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Time Division Multiple Access (TDMA), the Global System for Mobile access (GSM) variation of TDMA, and newer hybrid digital communication systems using both TDMA and CDMA technologies.

The use of CDMA techniques in a multiple access communication system is disclosed in U.S. Pat. No. 4,901,307, entitled "Spread Spectrum Multiple Access Communication System Using Satellite Or Terrestrial Repeaters" and U.S. Pat. No. 5,103,459, entitled "System And Method For Generating Signal Waveforms In A CDMA Cellular Telephone System," both of which are assigned to the assignee of the present invention and are incorporated herein by reference.

The method for providing CDMA mobile communications was standardized in the United States by the Telecommunications Industry Association/Electronic Industries Association in TIA/EIA/IS-95-A entitled *"Mobile Station-Base Station Compatibility Standard for Dual-Mode Wideband Spread Spectrum Cellular System,"* referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), cdma2000 (such as CDMA2000 1x or 3x standards, for example) or TD-SCDMA.

In wireless communication systems mobile stations or user terminals receive signals from fixed position base stations (also referred to as cell cites or cells) that support communication links or service within particular geographic regions adjacent to or surrounding the base stations. In order to aid in providing coverage, each cell is often sub-divided into multiple sectors, each corresponding to a smaller service area or geographic region. An array or series of base stations placed adjacent to each other form a communication system capable of servicing a number of system users, over a larger region.

Unfortunately, as extensive as the total coverage areas of many wireless systems appear to be, providing service or coverage to many mobile stations is not without difficulties. The deployment or positioning of base stations within a system may leave "gaps" or "holes" in the coverage area. That is, the arrangement of the base stations, which can be dictated by various known system design criteria, economics, convenience, or local zoning restrictions, does not allow the signal coverage of some base stations to reach certain areas that are adjacent to or even surrounded by a group of base stations. In addition, obstructions from geological features or man-made structures, may simply block signals in certain areas. Base stations may also be considered too expensive to place in lower populated or more rural areas, leaving large areas simply uncovered. Of course, any un-covered area or region means lost revenues for communication system operators or service providers.

Repeaters can provide a cost-effective way for carriers and service providers to fill holes in the coverage area or to augment the area of coverage. For example, rather than install a more expensive and complicated base station, a repeater can be used to extend the reach of existing base stations. Therefore, a carrier can achieve hole filling and otherwise augment the area of coverage for a given sector to provide capacity in an area that was previously not covered. One mark of a hole filling application is that the area is generally surrounded by coverage, often with the very sector that is also in communication with the repeater. Augmenting, or moving, the coverage area of a cell or sector effectively shifts the location or the shape of the coverage area from a sector. An example of this type of application might be to provide highway coverage. Assuming that two sectors cover a highway adjacent to a base station, the use of a repeater might be considered in order to provide coverage to an area beyond that immediately 'visible' or reached by signals from the base station location. Especially, for a more rural location.

The use of repeater technology is described in U.S. Pat. No. 6,108,364, entitled "Time Division Duplex Repeater for Use in a CDMA System", and the use of repeaters for obtaining signal diversity in view of urban canyons is described in U.S. Pat. No. 5,991,345, entitled "Method and Apparatus for Diversity Enhancement Using Pseudo-Multipath Signals", both of which are incorporated herein by reference.

However, the use of repeaters is not itself without problems in certain situations. As will be discussed further below, a repeater is not a noise-less device and will contribute thermal noise into the base station sector acting as the communication link, referred to as adding to the noise floor of the base station. The use of repeaters is further hindered by environmental factors causing fluctuations in repeater gain, and in the thermal noise contributions by the repeater at the base station. More specifically, the gain provided by a repeater is affected by factors such as: daily temperature variations (±6 dB); seasonal temperature variations (typically ±3 dB); attenuation caused by foliage or foliage changes during spring and summer; or new obstacles being erected along the base station-to-repeater path.

The phenomena stated above will result in fluctuations in the total amount of thermal noise at the base station, adversely affecting coverage as well as service in both the base station and repeater coverage areas. It can be seen that it is desirable to keep the gain of the repeater a constant. Therefore, it is desirable to have the ability to detect and quantify a change, and restore the gain of the repeater back to a pre-determined level.

What is needed is a new apparatus or technique to manipulate the power output of a repeater in such a manner that it can enhance coverage without adding undesirable noise to a communication system. This should be accomplished with a minimum of complexity and maximum ease of use. The present invention satisfies that need.

SUMMARY

The invention provides a mechanism for automatically setting a reverse link operating point for a repeater used in a communication system through the use of the reverse link power control of a built-in wireless device, for example a spread spectrum phone using CDMA or WCDMA standards protocols. By embedding a wireless communication device (WCD) inside the repeater and injecting the reverse link of the embedded WCD into the reverse link of the repeater, the gain of the repeater is maintained relatively constant. The embedded WCD can also be activated on a periodic basis to make calls and utilize reverse link power-control to calibrate or re-calibrate the gain of the repeater. Therefore, the repeater becomes a power-controlled repeater.

The invention can be realized using a method or apparatus to control output power for a repeater communicating with one or more base stations and remote stations in a wireless communication system, by adjusting the gain of amplification stages or elements used within the repeater. This invention also controls noise pushed to a donor base station communicating with the repeater and one or more remote stations.

In one embodiment, the method comprises coupling or transferring a pre-selected portion of a donor base station communication signal intended for remote stations to an embedded wireless communication device within the repeater, and establishing a communication link between the wireless communication device and donor base station in response to receiving the pre-selected portion. This is accomplished by transmitting a return link signal over a return signal path substantially co-extensive with remote station communication signals being transferred to the base station, then receiving power adjustment information from the donor base station and generating at least one power control signal for adjusting output transmission power. The return link gain of the repeater is adjusted in response to the power control signal.

In further aspects, a communication signal is received from the donor base station which is to be transferred to remote stations, while communication signals are received from one or more remote stations to be transferred to the base station along a predetermined signal path. Typically, the communication signals are selected from the group of CDMA, WCDMA, TDMA, TD-SCDMA, and GSM (including GPRS and EDGE) type communication signals. The pre-selected signal portion is processed in the wireless communication device to establish a forward communication link, which includes generating a reverse link communication signal for transfer to the donor base station. The reverse link signal is transferred along with the signals received from remote stations along the predetermined signal path to the donor base station. A communication signal from the donor base station directed to the wireless communication device is received and a power control signal, such as an automatic gain control signal, or command is generated in response to information in that signal. The repeater adjusts the return link gain based on that power control signal or command.

Further aspects of the invention comprise transferring amplified remote station communication signals and received donor base station communication signals through a first duplexor; power coupling a pre-selected portion of a donor base station communication signal to the wireless communication device, which may include attenuating the signal by a pre-selected amount in some embodiments; and transferring amplified donor base station communication signals and received remote station communication signals through a second duplexor. The return link signal output by the wireless communication device is combined with remote station communication signals, and may also be attenuated in some embodiments before being combined.

The method can further comprise periodically establishing a communication link between the wireless communication device and donor base station, and generating at least one power control signal based on information related to signal power determined during a duration of the communication link. This feature is especially useful when initially setting up a repeater, since the repeater can effectively "call in" to the base station and establish an appropriate power level without manual intervention.

Apparatus for controlling the output power for a repeater communicating with one or more donor base stations and remote stations in a wireless communication system, comprises means for coupling or transferring a pre-selected portion of a donor base station communication signal intended for remote stations to an embedded wireless communication device within the repeater, and means for establishing a communication link between the wireless communication device and donor base station in response to the pre-selected portion by transmitting a return link signal over a return signal path shared with remote station communication signals being transferred to the base station. Also, included is means for receiving power adjustment information from the donor base station and generating at least one power control signal for adjusting the output transmission power, and means for adjusting the return link gain of the repeater based on that power control signal.

The apparatus can further comprise means for receiving various communication signals from a donor base station or remote stations, along with means for amplifying these signals and retransmitting them. The signals are transferred through duplexors to amplification stages. Means are provided for processing the pre-selected portion to establish a forward communication link, and for generating a reverse link communication signal in the wireless communication device. The apparatus transfers the reverse link communication signal from the wireless communication device along with signals received from covered remote stations along a shared signal path to the base station. In addition, means are provided for receiving a communication signal from the base station directed to the wireless communication device and for generating a power control signal. The power control signal may be detected using means for detecting in the repeater, and the return link gain then adjusted using means for adjusting the gain, based on the detected power control signal.

Signals input to or output from the wireless communications device may be processed by one or more means for attenuating before transfer into or from the wireless communication device, as desired. A resulting attenuated return link signal output from the wireless communication device is combined with remote station communication signals. The attenuation before transfer into or from the wireless communication device is typically only necessary in the case of using a standard production wireless communications device, if a custom device was designed for this application, the attenuation could be avoided.

The apparatus further comprises means for periodically establishing a communication link between the wireless communication device and donor base station, so that at least one power control signal is generated based on information related to signal power determined during a duration of the communication link.

In some embodiments, the communication signal from the donor base station has a first frequency, and communication signals from one or more remote stations have a second frequency different from the first.

In still further embodiments, more than one repeater is used, with one communicating directly with a base station and the others communicating with either the first as a series of remote stations, or in a series one to the other and then to the first repeater.

BRIEF DESCRIPTION OF THE DRAWINGS

The features, objects, and advantages of the present invention will become more apparent from the detailed description set forth below when taken in conjunction with the drawings in which like reference characters identify the same or functionally similar elements throughout. In addition, the left-most digit of the reference number refers to the figure in which the reference number first appears in the accompanying drawings.

DETAILED DESCRIPTION OF EMBODIMENTS OF THE INVENTION

I. Introduction

The present invention is a method and apparatus for controlling the gain and the transmission power of a repeater used in a wireless communication system by embedding a wireless communication device circuit within the repeater. The wireless communication device is power controlled or adjusted by base stations with which it communicates over a communication link held in common with repeater return link communication signals. One or more signals or commands generated by the wireless device interact with the repeater to cause the repeater to be gain and thus power controlled. As would be apparent to one skilled in the relevant art, the concept of the present invention can be applied to many types of communications systems where power control is used and there is a desire to reduce signal interference or degradation.

Embodiments of the invention are discussed in detail below. While specific steps, configurations and arrangements are discussed, it should be understood that this is done for illustrative purposes only. It would be apparent to one of skill in the art that the invention may be implemented in many different embodiments of hardware, software, firmware, and/or the elements illustrated in the figures, and that other steps, configurations and arrangements can be used without departing from the spirit and scope of the present invention.

Figure 1:
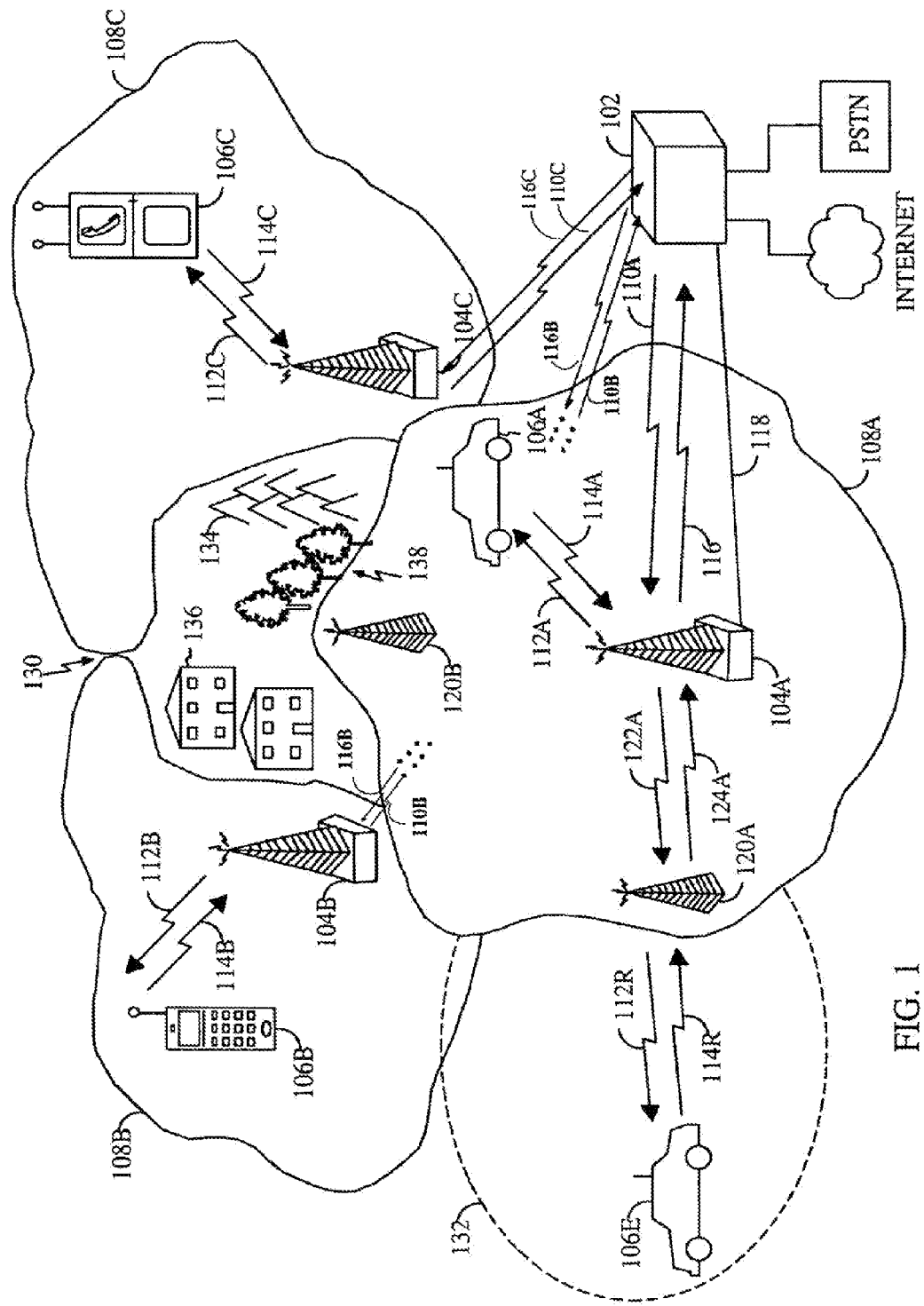
FIG. 1 illustrates a typical wireless communications system using several base stations and repeaters.

Before describing embodiments of the invention in detail, it is helpful to describe an example environment in which they may be usefully implemented. The present invention is particularly useful in mobile communication system environments. FIG. 1 illustrates such an environment.

II. Exemplary Operational Environment

FIG. 1 is a diagram of a typical wireless communication system 100, such as a cellular telephone system. Wireless communication system (WCS) 100, uses one or more control stations 102, sometimes referred to as base station controllers (BSC), and a plurality of base stations 104A, 104B, and 104C, sometimes referred to as base station transceiver system (BTS). Base stations 104A-104C communicate with remote stations or wireless communication devices (WCD) 106A-106C, respectively, that are within service areas 108A-108C of base stations 104A-104C, respectively. That is, in this case, base station 104A communicates with remote station 106A within service area 108A, base station 104B with remote station 106B within service area 108B, and base station 104C with remote station 106C within service area 108C.

Base stations transmit information in the form of wireless signals to user terminals across forward links or forward link communication channels, and remote stations transmit information over reverse links or reverse link communication channels. Although FIG. 1 illustrates three base stations 104A-104C, other numbers of these elements may employed to achieve a desired communications capacity and geographic scope, as would be known. While fixed base stations are described, it is to be appreciated that in some applications portable base stations may be used, or even stations positioned on movable platforms such on trains, barges, or trucks, as desired.

Control station 102 may be connected to other control stations 102, central systems control stations (not shown) for the communication system 100, or other connected systems communication systems such as a public switched telephone network (PSTN) or the Internet. Thus, a system user at remote station 106 is provided with access to other communication portals using wireless system 100.

Base stations 104A-104C may form part of terrestrial based communication systems and networks that include a plurality of PCS/cellular communication cell-sites. They can be associated with CDMA or TDMA (or hybrid CDMA/TDMA) digital communication systems, transferring CDMA or TDMA type signals to or from remote stations. Signals can be formatted in accordance with IMT-2000/UMT standards, using WCDMA, CDMA2000 or TD-SCDMA type signals. On the other hand, base stations 104 can be associated with an analog based communication system (such as AMPS), and transfer analog based communication signals.

Remote stations 106A-106C each have or comprise apparatus or a wireless communication device (WCD) such as, but not limited to, a cellular telephone, a wireless handset, a data transceiver, or a paging or position determination receiver. Furthermore, such remote stations can be hand-held, portable as in vehicle mounted (including cars, trucks, boats, trains, and planes) or fixed, as desired. For example, FIG. 1 illustrates remote station 106A as a portable vehicle mounted telephone or WCD, remote station 106B as a hand-held apparatus, and remote station 106C as a fixed device.

In addition, the teachings of the invention are applicable to wireless devices such as one or more data modules or modems which may be used to transfer data and/or voice traffic, and may communicate with other devices using cables or other known wireless links or connections, for example, to transfer information, commands, or audio signals. In addition, commands might be used to cause modems or modules to work in a predetermined coordinated or associated manner to transfer information over multiple communication channels. Wireless communication devices remote stations are also sometimes referred to as user terminals, mobile stations, mobile units, subscriber units, mobile radios or radiotelephones, wireless units, or simply as 'users,' phones; 'terminals,' or 'mobiles' in some communication systems, depending on preference.

In the present example environment, remote stations 106A-106C and base stations 104A-104C engage in wireless communications with other elements in WCS 100 using CDMA communication techniques. Therefore, signals transmitted across the forward (to the remote stations) and reverse links (from the remote stations) convey signals that are encoded, spread, and channelized according to CDMA transmission standards. A forward CDMA link includes a pilot channel or signal, a synchronization (sync)-channel, several paging channels, and a larger number of traffic channels. The reverse link includes an access channel and a number of traffic channels. The pilot signal is used to alert mobile stations of the presence of a CDMA-compliant base station. The signals use data frames having a predetermined duration, such as 20 milliseconds. However, this is for convenience in description, and the present invention may be employed in systems that employ other communications techniques, such as time division multiple access (TDMA), and frequency division multiple access (FDMA), or other waveforms or techniques as listed above, as long as the communication system or network sends power control commands to the remote station.

In any case, the wireless signals need to be transmitted at power levels sufficient to overcome noise and interference so that the transfer of information occurs within specified error rates. However, these signals need to be transmitted at power levels that are not excessive so that they do not interfere with communications involving other remote stations. Faced with this challenge, base stations and remote stations can employ dynamic forward link power control techniques to establish appropriate forward link transmit power levels.

Conventional forward link power control techniques involve closed loop approaches where user terminals provide base stations with feedback that specifies particular forward link transmit power adjustments, referred to as up/down commands because they direct either a power increase or a power decrease. For example, one such approach involves a user terminal determining signal-to-noise ratios (SNRs) or bit error rates (BER) of received forward link traffic signals, and requesting the base station to either increase or decrease the transmit power of traffic signals sent to the remote station based on the results. In addition to transmitting up/down commands, other types of information may be transmitted to base stations periodically including various power and noise measurements to support operations, such as "handoffs" between base stations.

Typically, base stations 104A-104C adjust the power of the signals that they transmit over the forward links of WCS 100. This power (referred to herein as forward link transmit power) may be varied according to requests by, information from, or parameters for remote stations 106A-106C, and according to time. This time varying feature may be employed on a frame-by-frame basis. Such power adjustments are performed to maintain forward link BER or SNR within specific requirements, reduce interference, and conserve transmission power.

Typically, remote stations 106A-106C also adjust the power of the signals that they transmit over the reverse links of WCS 100, under the control of control station 102 or base stations 104A-104C. This power (referred to herein as reverse link transmit power) may be varied according to requests by or commands from a BTS, received signal strength or characteristics, or parameters for remote station operation, and according to time. This time varying feature may be employed on a frame-by-frame basis. Such power adjustments are performed to maintain reverse link bit error rates (BER) within specific requirements, reduce interference, and conserve transmission power.

Examples of techniques for exercising power control in such communication systems are found in U.S. Pat. No. 5,383,219, entitled "Fast Forward Link Power Control In A Code Division Multiple Access System," U.S. Pat. No. 5,396,516, entitled "Method And System For The Dynamic Modification Of Control Parameters In A Transmitter Power Control System," and U.S. Pat. No. 5,056,109, entitled "Method and Apparatus For Controlling Transmission Power In A CDMA Cellular Mobile Telephone System," which are incorporated herein by reference.

III. Service Areas

As discussed, each base station has a service area 108 (108A-108C) which can be generally described as the geographical extent of a locus of points for which a remote station 106 can communicate effectively with the base station. As an example, when a remote station 106 is within a service area 108, messages can be transmitted from control center 102 to a base station 104 (104A-104C) using a forward link 110 (110A-110C), and from base station 104 to a remote station 106 using a forward link 112 (112A-112C). Messages are transmitted from a remote station 106 to a base station 104 over a return link 114 (114A-114C). These messages are transmitted to the control center 102 using a return link 116 (116A-116C). 122A is a forward link from repeater 104A to repeater 120A. 124A is a return link from repeater 120A to repeater 104A. 112R is a forward link from repeater 120A to a remote station 106E. 114R is a return link from remote station 106E to repeater 120A.

Some or all of the communications between a base station 104 and control station 102 can be carried over other wireless, such as microwave, radio, or satellite type links, or non-wireless transfer mechanisms such as, but not limited to dedicated wireline services, optical or electronic cables and so forth, all indicated as line 118, if desired. Also, messages transmitted using forward links 110 and 112 are typically modulated in different frequency bands or modulation techniques than the messages transmitted over reverse links 114 and 116. The use of separate forward and reverse links allows full duplex communications between the control center 102 and the remote station 106. TD-SCDMA systems use time division duplexing to accomplish the forward and reverse links, so a power controlled repeater could be implemented using either time division duplexing or frequency division duplexing.

The service area of a base station is illustrated as generally circular or elliptical in FIG. 1 for convenience. In actual applications, local topography, obstructions (buildings, hills, and so forth), signal strength, and interference from other sources dictate the shape of the region serviced by a given base station. Typically multiple coverage areas 108 (108A-108C) overlap, at least slightly, to provide continuous coverage or communications over a large area or region. That is, in order to provide an effective mobile telephone or data service, many base stations would be used with overlapping service areas, where the edges have decreased power.

One aspect of the communication system coverage illustrated in FIG. 1, is the presence of an uncovered region 130, which can often be referred to as a hole, or an uncovered region 132 which is simply outside of WCS 100 normal coverage areas. In the case of a "hole" in coverage, there are areas surrounding or at least adjacent to the covered areas which can be serviced by base stations, here base stations 104A-104C. However, as discussed above a variety of reasons exist for which coverage might not be available in regions 130 or 132.

For example, the most cost effective placement of base stations 104A-104C might place them in locations that simply do not allow their signals to reliably reach or cover regions 130 or 132. Alternatively, topological features such as mountains or hills 134, man made structures 136, such as tall buildings or urban canyons often created in central urban corridors, or vegetation 138, such as tall trees, forests, or the like, could each partially or completely block signals. Some of these effects can be temporary, or change over time, to make system installation, planning, and use even more complex.

While it is possible to extend coverage of the cellular telephone network 100 by simply adding more base stations 104 to cover additional geographical territory, it is sometimes very difficult and uneconomical to do so. Not only are base stations relatively complex and costly or hard to cite, but regions sought to be covered may have irregular shapes with unusual multi-path or fading characteristics that make using a base station difficult. The area may also be a lower communication traffic density area where lower or only occasional use is anticipated.

In many cases, for example, the territory sought to be covered has enough traffic to justify the use of a repeater 120 but not a base station. It may also be more amenable to using several repeaters to cover unusually shaped regions or circumvent the problems of blockage. In this situation, one or more repeaters 120 (120A, 120B) accept transmissions from both a remote station 106 (106D) and a base station 104 (104A), and act as an intermediary between the two, essentially operating as a "bent pipe" communication path. Using a repeater 120, the effective range of a base station 104 is extended to cover extended service area 132.

While the use of repeaters 120 is a more cost effective way to increase range or coverage for base stations, it has some disadvantages. One major disadvantage that has been discovered, is the increase in noise for base stations servicing or using the repeater.

IV. Repeater Overview

Figure 2:
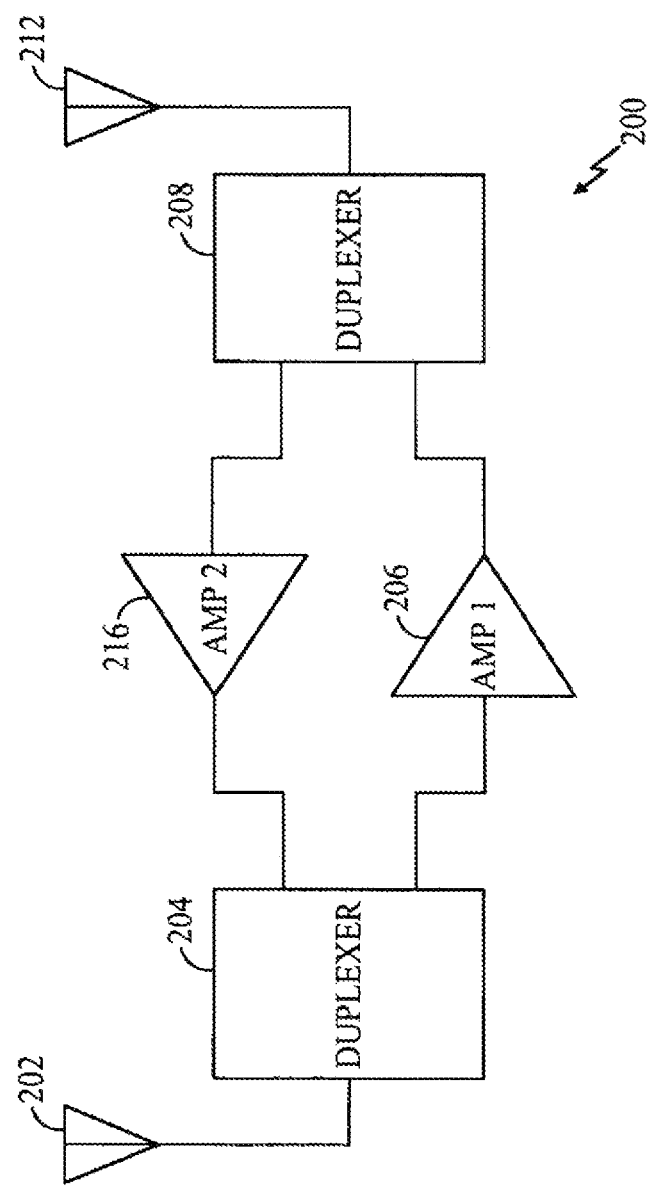
FIG. 2 illustrates a simplified high-level view of a repeater design.

FIG. 2 is simplified block diagram of a repeater 200. A more typical commercial repeater would most likely have additional components including additional filtering and control elements to control noise, out of band emissions, and to regulate the gain. Repeater 200 includes a donor antenna 202 for receiving signals, a duplexor 204, an amplifier 206 for amplifying signals received at the donor antenna, a second duplexor 208, and a server or coverage antenna 212 for transmitting (or repeating) signals received by the repeater 200. A second amplifier 216 is also included which amplifies signals received at server antenna 206, and provides the amplified signals to the donor antenna.

The two duplexers (204, 208) are used to split or separate the forward link and reverse link signals (frequencies) to provide necessary isolation between the two so that they do not enter the other processing chains of repeater 200. That is, to prevent transmissions from entering receivers, and so forth, and degrading performance. The receive or receiver duplexer (204) is coupled to an antenna referred to as the donor antenna (202), since it receives signals "donated" from another source, such as a base station, also referred to as a donor cell. The donor is more typically not a cell or cell site but a sector within a cell being handled by the donor base station. The antenna coupled to the duplexer on the transmission or output side (208) of the repeater processing is referred to as the output or coverage antenna (212).

For embodiments used in cellular phone or wireless communication systems, such as those mentioned above, a duplexer is chosen to operate in what is referred to as the 800 MHz band. Typically this would mean with a forward link frequency of around 882.75 MHz and a reverse link frequency of around 837.75 MHz. However, these frequencies are dependent upon the specific system in which the repeater is used, as indicated above, and the duplexer would be chosen according, as would be known. For example PCS systems operate around 1900 MHz while typical GSM systems around 1800 MHz and UMTS around 2100 MHz.

The isolation provided between the two frequencies is typically greater than 100 dB, which is sufficient to maintain repeater stability. The bandwidth of each link is typically on the order of 5 MHz. A smaller bandwidth is desirable to reject potential interference by signals from FM, GSM, and other CDMA carriers. However, to achieve a smaller bandwidth, SAW filters are typically required, which is not as desirable, so this may be avoided for many embodiments, as desired.

While the basic repeater can apparently act as a bent-pipe and transfer signals back and forth, a problem has been discovered, as discussed above, related to repeater thermal noise contribution, herein called "push" at the BTS, and how fluctuations in repeater gain are going to adversely affect the push. It can be easily shown that it is undesirable to have a varying amount of thermal noise at the BTS, and embodiments of the invention allow a new type of reverse link power-control in the repeater that can maintain a substantially constant repeater thermal noise push at the BTS.

V. Repeater Reverse Link Analysis

Figure 3:
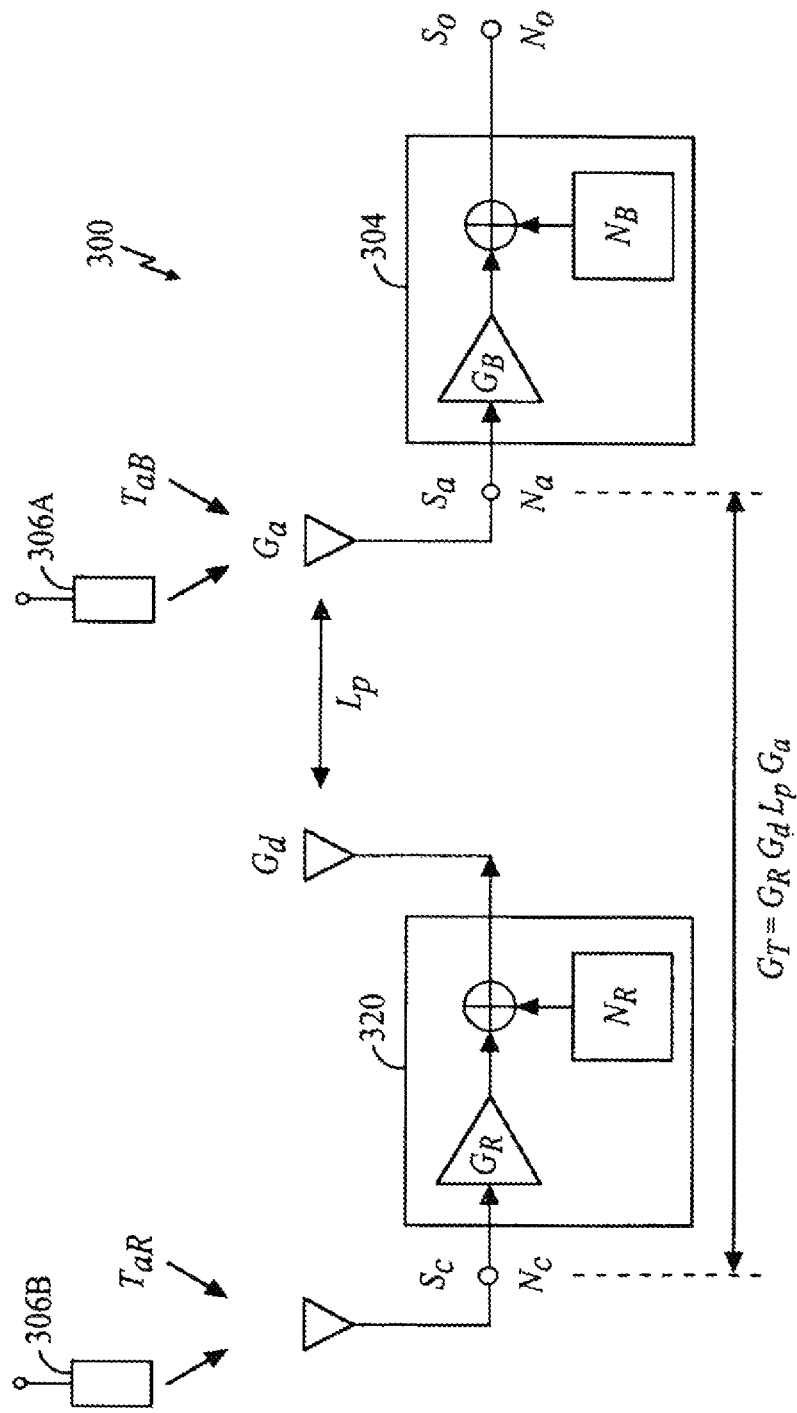
FIG. 3 illustrates a model of equivalent functions of the repeaters in FIG. 1.

The effective noise factor of the repeater as well as that of the BTS under zero-load condition, can be used to derive a repeater thermal noise push relationship. With the repeater thermal noise push quantified, one can establish the relationship for maintaining a constant repeater thermal noise push at the BTS. To accomplish this analysis, one can start with a WCS model 300, as shown in FIG. 3, which shows two remote or mobile stations 306A and 306B communicating through a base station 304 and a repeater 320, respectively, in a modeled communication system 300. That is, a functional and parameter based replica of the operations performed within the WCS. Some parameters used in this model are shown in Table I.

TABLE I

| Parameter | Definition |
|---|---|
| | General |
| $T_{oI}$ | Reference temperature which is equal to 290° K |
| K | Boltzman's Constant or $1.38 \times 10^{-23}$ Joules/Kelvin |
| W | Bandwidth of the signal. In this example, W = 1.228 MHz |
| | Repeater |
| $T_{aR}$ | Antenna temperature of the repeater coverage antenna |
| $S_c$ | Signal power at repeater coverage antenna connector |
| $N_c$ | Noise power density at repeater coverage/server antenna connectors |
| $G_R$ | Gain of the repeater |
| $N_R$ | Repeater additive noise power density, $N_R = k\, T_{eR}\, G_R$ |
| $F_R$ | Repeater noise factor, $F_R = 1 + T_{eR}/T_o$ |
| $T_{eR}$ | Repeater effective noise temperature, $T_{eR} = (F_R - 1)\, T_o$ |
| $G_d$ | Gain of the repeater donor antenna |
| | Path Loss between BTS and Repeater |
| $L_p$ | Path loss between repeater donor antenna and BTS antenna |
| | Base Station |
| $G_a$ | BTS antenna gain |
| $T_{aB}$ | BTS antenna temperature |
| $S_a$ | BTS antenna connector signal power |
| $N_a$ | BTS antenna connector noise power density |
| $G_B$ | BTS gain |
| $S_O$ | BTS output signal power |
| $N_O$ | Noise power density at BTS output |
| $N_B$ | Additive noise power density of BTS, $N_B = k\, T_{eB}\, G_B$ |
| $F_B$ | Noise factor of the base station, $F_B = 1 + T_{eB}/T_o$ |
| $T_{eB}$ | Effective noise temperature of BTS, $T_{eB} = (F_B - 1)\, T_o$ |
| $G_T$ | BTS-repeater link gain, $G_T = G_R\, G_d\, L_p\, G_a$ (assuming negligible cable losses, which could be added) |

1. Effective Noise Factor of Repeater

It is first very useful to determine the effective noise factor of the repeater, $EF_R$, under zero-load condition. In looking at the system model shown in FIG. 3, the thermal noise density emanating from the repeater donor antenna is given by:

$$N_{repeater} = k(T_{aR} + T_{eR})G_R G_d, \quad (1)$$

and the thermal noise contribution from the repeater at the output of the BTS is:

$$N_{repeater}^{@BTS} = N_{repeater} L_p G_a G_B. \quad (2)$$

In the absence of a repeater in the base station coverage area, the nominal thermal noise density at the output of the BTS is given by:

$$N_O^{nom} = k(T_{aB} + T_{eB})G_B. \quad (3)$$

With the addition of a repeater in the BTS coverage area, the total thermal noise density at the output of the BTS can be modeled as the sum of a contribution from the repeater (Eq. 2) and the nominal case (Eq. 3). Therefore, we have:

$$N_O = N_{repeater}^{@BTS} + N_O^{nom} \quad (4)$$

which becomes:

$$N_O = N_{repeater} L_p G_a G_B + k(T_{aB} + T_{eB})G_B \quad (5)$$
$$= k(T_{aR} + T_{eR})G_R G_d L_p G_a G_B + k(T_{aB} + T_{eB})G_B,$$
$$= k(T_{aR} + T_{eR})G_T G_B + k(T_{aB} + T_{eB})G_B.$$

From this relationship, one can see that the total thermal noise density at the output of the BTS reverts to a nominal case when: the path loss, $L_p$, between the repeater and the BTS increases and $G_T$ approaches 0, the repeater signal is completely blocked from the BTS, or the repeater is turned off.

From this model of the total thermal noise density at the BTS output, the effective noise factor of the repeater, $EF_R$, is defined as the signal-to-noise ratio at repeater coverage antenna connector over that at the output of the base station, which is:

$$EF_R = \frac{S_c / N_c W}{S_O / N_O W} = \frac{S_c}{S_O} \frac{N_O}{N_c}, \text{ then} \quad (6)$$

$$EF_R = \frac{k(T_{aR} + T_{eR})G_T G_B + k(T_{aB} + T_{eB})G_B}{kT_{aR}G_T G_B}. \quad (7)$$

If $T_{aR}$ is set equal to $T_o$, the expression for the effective noise factor of the repeater becomes:

$$EF_R = \frac{k(T_o + T_{eR})G_T G_B + k(T_o + T_{eB})G_B}{kT_o G_T G_B}, \text{ and} \quad (8)$$

$$EF_R = F_R + \frac{F_B}{G_T} \quad (9)$$

Due to presence of the BTS antenna, Equation 8 differs from that for a set of conventional noisy gain blocks since the noise contribution from both the BTS antenna and the repeater are present at the input of the BTS. In the absence of the BTS antenna, the effective noise factor of the repeater is:

$$EF_R = F_R + \frac{F_B - 1}{G_T}. \quad (10)$$

If we multiply the numerator and denominator of Equation 8 by the nominal thermal noise density of the BTS, we can re-arrange it to obtain:

$$EF_R = \frac{k(T_o + T_{eR})G_T G_B + k(T_o + T_{eB})G_B}{k(T_o + T_{eB})G_B} \frac{k(T_o + T_{eB})G_B}{kT_o G_B} \frac{1}{G_T}. \quad (11)$$

The first term of Equation 11 is the push exerted by a repeater on the nominal thermal noise density at the BTS, while the second term is simply the nominal noise factor of the BTS. Thus, if we define $P_{thermal}$ as the repeater thermal noise push at the BTS, we have:

$$P_{thermal} = \frac{k(T_o + T_{eR})G_T G_B + k(T_o + T_{eB})G_B}{k(T_o + T_{eB})G_B}, \text{ and} \quad (12)$$

$$EF_R = P_{thermal} \frac{F_B}{G_T}. \quad (13)$$

2. Effective Noise Factor of BTS

In calculating an effective noise factor of the BTS, $EF_B$, under zero-load condition, the thermal noise contribution from the repeater is modeled as another additive noise source at the output of the BTS. Therefore, the expression for the effective noise factor of the BTS is:

$$EF_B = \frac{k(T_{aR} + T_{eR})G_T G_B + k(T_{aB} + T_{eB})G_B}{kT_{aB}G_B} \quad (14)$$

Substituting $T_{aR}=T_{aB}=T_o=290°$ K, this becomes:

$$EF_B = F_R G_T + F_B. \quad (15)$$

and, it is evident that the effective repeater noise factor and the effective BTS noise factor are related by the BTS-repeater link gain, $$EF_B = EF_R G_T \quad (16)$$

and, hence, in dB, the difference between effective BTS noise figure and effective repeater noise figure equals $G_T$, the BTS-repeater link gain. A review of the above relationships also shows that as $G_T$ increases, the effective repeater noise factor is going to approach the nominal repeater noise factor. On the other hand, when $G_T$ decreases, the effective BTS noise factor is going to approach the nominal BTS noise factor.

3. Repeater Thermal Noise Push

An expression can now be produced for the repeater thermal noise push at the BTS in terms of nominal BTS noise factor, $F_B$, nominal repeater noise factor, $F_R$, and BTS-repeater link gain, $G_T$. More specifically, from Equations 9 and 13, one can see that:

$$EF_R = P_{thermal}\frac{F_B}{G_T} = F_R + \frac{F_B}{G_T}, \text{ and} \quad (17)$$

$$P_{thermal} = \frac{F_R}{F_B}G_T + 1.$$

Equation 17 represents the repeater thermal noise push equation, which shows that repeater thermal noise push at the BTS is linear with respect to BTS-repeater link gain. Moreover, the slope of $P_{thermal}$ versus $G_T$ is the ratio of nominal repeater noise factor over nominal BTS noise factor. However, looking at Equations 4 and 12 provide another perspective of the repeater thermal noise push since:

$$P_{thermal} = \frac{k(T_o + T_{eR})G_T G_B + k(T_o + T_{eB})G_B}{k(T_o + T_{eB})G_B} = \quad (18)$$

$$\frac{N_{repeater}^{@BTS} + N_O^{nom}}{N_O^{nom}} = \frac{N_{repeater}^{@BTS}}{N_O^{nom}} + 1$$

which can be used to assist in producing an effective process or algorithm for operating a power-controlled repeater, as discussed below.

VI. Overview of Power Control in a Repeater

The above describes the rise that occurs in thermal noise level at the BTS caused by the addition of a repeater in a BTS coverage area. This phenomena, as stated above, will result in fluctuations in the total amount of thermal noise at the BTS, and adversely affect coverage as well as service in both the BTS and repeater coverage areas. For a BTS with a repeater in its coverage area, it has been shown that the effective repeater noise factor as well as the effective BTS noise figure are related by the BTS-repeater link gain. From the effective repeater noise factor one can also see that the repeater thermal noise push is linear with respect to the BTS-repeater link gain, and the slope is given by nominal repeater noise factor over nominal BTS noise factor.

This phenomena, as stated above, will result in fluctuations in the total amount of thermal noise at the BTS, and adversely affect coverage as well as service in both the BTS and repeater coverage areas. Therefore, it is desirable to have the ability to detect and quantify changes, and restore the gain of the repeater back to a pre-determined level. That is, it is desirable to keep the gain of a repeater relatively constant.

It has been discovered that this can be accomplished economically, with low complexity, by embedding a wireless communication device, or equivalent circuitry or capability inside, that is within the operating structure of, the repeater, and by injecting the reverse link signal output of the embedded WCD into the reverse link of the repeater. With a common reverse link, WCD reverse link power-control can be utilized to calibrate the gain of the repeater. This provides for an automatic setting of a repeater reverse link operating point through the use of the reverse link power control of the built-in WCD, which produces a power-controlled repeater which, in conjunction with reverse link power-control, can maintain a substantially constant or low fluctuation repeater thermal noise push at the BTS, and improve repeater performance.

With the embedded WCD, one can also establish periodic calls or communication sessions between the repeater and a base station, and utilize reverse link power-control for the WCD to calibrate or re-calibrate the gain of the repeater. This improves repeater performance in general and also allows the repeater to dial-in automatically during repeater installation to establish and then maintain a desired operating point throughout a use period, which could be useful life, of the repeater. This effectively compensates for variations in repeater-to-BTS path loss, environmental conditions, amplifier aging, and changes in user load that deleteriously impact the reverse link for the repeater.

The power-controlled repeater also stabilizes the reverse link operating point, essentially keeping remote stations in the repeater coverage area from "hitting" the BTS with too much or too little power.

VII. Power-Controlled Repeater

Figure 4:
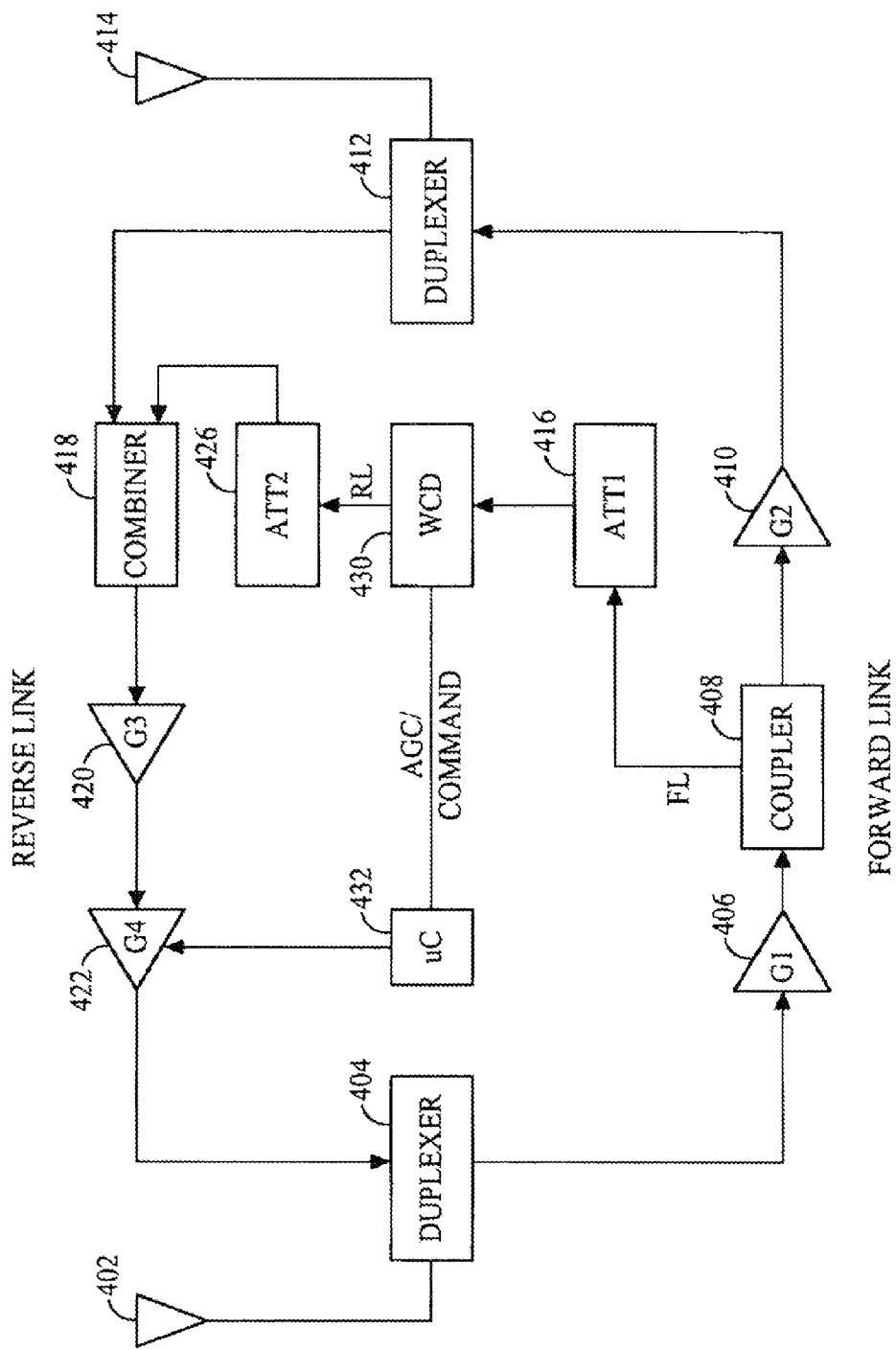
FIG. 4 illustrates a high-level repeater design using the invention.

A block-diagram of one embodiment of an exemplary power-controlled repeater is shown in FIG. 4, and is described in terms of the basic elements used in implementing repeater forward and reverse links. In FIG. 4, a repeater 400 is shown having a donor antenna 402 and a coverage antenna 414. Repeater 400 has a forward link that has two duplexers 404 and 412, two amplifiers 406 and 410, a coupler 408, and a fixed attenuator 416. However, fixed attenuator 416 is not required for implementing all embodiments.

Repeater 400 is also shown having a reverse link that uses the two duplexers 404 and 412, a combiner 418, an amplifier 420, an adjustable or variable amplifier 422, and a fixed attenuator 424. The variable amplifier 422 could also be implemented using a variable attenuator. A wireless device or circuit 430 is shown coupled between the two links (forward and reverse) having at least one output connected to a processor or controller 432, shown as part of the reverse link.

The two duplexers 404 and 412 are used to split or separate the forward and reverse link signals, as discussed above, while combiner 418 is used to add the output of the wireless device 430 embedded in the repeater, the transmit signal, to the repeater reverse link path. This allows the wireless device to communicate with at least one, and typically only one, base station. An exemplary duplexor useful for cellular communication frequencies is manufactured by Celwave under the part number 5043-8-3.

The combiner is placed at the input of the amplifier chain of the reverse link primarily to maintain repeater stability, although this is not strictly necessary for every embodiment. Since the reverse link signal levels are smallest at this location, the amount of reverse link power that is coupled to the repeater forward link through the repeater wireless device loop is minimized. An exemplary combiner useful for implementing embodiments is manufactured by Minicircuits under the part number ZFSC-2-2.

Coupler or power coupler 408 is used to couple some of the forward link power to an input for wireless device 430 embedded within the structure of repeater 400, which is discussed further below. A typical value selected for signal power to be coupled into the wireless device is 20 dB, a value that is generally considered sufficiently low so as to not degrade forward link performance. However, depending on the design of the remainder of the repeater components, one skilled in the art can readily use a different coupling coefficient, as desired. An exemplary coupler useful for implementing embodiments is manufactured by Narda under the part number 4242-20.

For the repeater forward link signal presented to the mobile phone 430, antenna 402, duplexer 404, amplifier 406 along with fixed attenuator 416, are used.

Fixed attenuator 416 is used to set the forward link gain in this embodiment. The forward link gain is set for different repeater-to-BTS path losses and different BTS transmit power levels. The adjustment can be accomplished simply by manually inserting different coaxial attenuators, or use other more automated approaches that are known in the art. The mobile 430 should be capable of implementing the power control algorithm for the selected radio technology. For a typical CDMA mobile, the forward link power determines the open loop estimate for reverse link transmission level, so the design should satisfy this criteria with the power level of the forward link signal applied to the mobile, and the value of attenuator 426.

The gain of the reverse link gain chain, comprising amplifier 420, fixed attenuator 426, and adjustable amplifier 422, is used to set the reverse link gain of the repeater. As part of this process, several parameters are important. The repeater noise figure which is set such that it minimizes the push the repeater thermal noise has on the base station thermal noise floor. This is accomplished primary by placing fixed attenuator 426 and adjustable amplifier 422 at the output. The gain of the amplifiers is set high enough to minimize the influence the attenuators have on the repeater noise figure.

Fixed attenuator 426 is used to set the power level at which a remote station within repeater coverage "hits" or transfers signals to the base station. The setting of this attenuator is described further below. Adjustable gain 422 is used to adjust the reverse link gain of the repeater to a desired, referred to as "correct," operating point during repeater operation in the field. This setting is controlled by what is referred to as a repeater WCD or phone loop, which is described further below.

A repeater phone loop consists of a repeater phone or WCD, a micro-controller, and the adjustable gain element on the reverse link (422), and possibly a fixed attenuator (426). When using repeater 400 in a CDMA type communication system, the repeater phone selected for this embodiment would be an IS-95 CDMA, CDMA2000 1x, CDMA2000 1X/EV, or WCDMA type wireless device, depending on the communication protocol being used. A typical WCD 430 is discussed further below. However, other device types would be used with other signal protocols, such as those mentioned above, as would be well understood.

WCD or phone 430 is used to communicate with a BTS, receive calls, interpret BTS power control commands, and transmit data. Essentially, it behaves like any other CDMA phone in a communications system or network. One significant difference in the repeater phone, as compared to a typical CDMA remote station, is that the repeater reverse link amplifier chain is used as the repeater phone transmit amplifier. Power control functions for the repeater phone are performed by this amplifier chain and not by an internal WCD or phone transmit amplifier. This gives the repeater phone the ability to power control the reverse link gain of the repeater.

This is accomplished in one embodiment by intercepting, or breaking out the internal automatic gain control (AGC) signal generated within the repeater WCD or phone. Essentially, the AGC line in the WCD is broken at a transmit amplifier input and routed to the adjustable gain amplifier 422 (G4) after passing through a micro-controller. This is easily accomplished through re-design of the WCD for this function, or even through retro-fitting a device by simple modification of circuit connects to couple the AGC signal line to a connector for further connection to circuitry in the repeater. Those skilled in the art will readily understand how to achieve such modifications. The internal repeater WCD transmit amplifier is then used as a "fixed gain" pre-amplifier to the repeater reverse link amplifier chain, since the AGC signal will no longer be adjusting its output power. In one CDMA embodiment, the gain of the repeater WCD transmit amplifier is set to transmit at around −50 dBm at the WCD transmit output port, which would normally be an antenna output. This transmit power level is typically a minimum transmit power level for the repeater WCD, and is selected for repeater stability.

It is desirable to have the amplifier output for at least amplifier 422 selected to be relatively high when the repeater is placed at or very near the edge of cell coverage for a BTS. One embodiment sets the amplifier about 10 dB below an expected peak value as the general maximum value which allows the repeater to be installed at the edge of BTS coverage and still have 10 dB of swing to compensate for such things as temperature drift and repeater amplifier aging. This 10 dB minimum attenuation of the amplifier gain is a conservative estimate that should be sufficient to ensure good repeater functionality.

Micro-controller 432 is used to achieve several WCD operations or manipulations that might otherwise be provided by a WCD user, or an automated system. For example, micro-controller 432 communicates with WCD or phone 430 to answer or attempt to open a communication link when there is an incoming "call," to send power control commands from WCD 430 to amplifier 422 throughout the call, to latch the amplifier output level once power control settles, and to then "hang-up the phone" or otherwise terminate service or tear down a call when a link is no longer desired or appropriate.

Micro-controller 432 may be implemented primarily in hardware using, for example, a software-controlled processor or controller programmed to perform the functions described herein, a variety of programmable electronic devices, or computers, a microprocessor, one or more digital signal processors (DSP), dedicated function circuit modules, and hardware components such as application specific integrated circuits (ASICs) or programmable gate arrays (PGAs). Implementation of a hardware state machine so as to perform the functions described herein will be apparent to persons skilled in the relevant art(s). Micro-controller 432, as discussed below, may be implemented within the WCD to save hardware, if the WCD has sufficient processing power. Micro-controller 432 is shown in 400 to illustrate the function, and could be external to the WCD 430, or internal to the WCD.

Where embodiments are implemented using software, the software can be stored in a computer program product and loaded into the system using a removable storage drive, memory chips or communications interface. The control logic (software), when executed, causes the controller to perform certain functions as described herein.

The micro-controller receives the reverse link gain control commands from WCD 430, slows the commands down below about a 800 dB/sec. rate, and outputs the commands to amplifier 422. The slowing down of the power control commands is done in order to keep the power control of remote stations in the repeater coverage area from fighting against the power control of WCD 430.

Since remote stations in the repeater coverage area are passing through the repeater reverse link, any change in the repeater reverse link will cause the BTS to send power control commands to these remote stations to compensate. If WCD 430 is in the process of changing the repeater reverse link gain with power control, and the transmit power of remote stations in repeater coverage has not settled, then these remote stations can create additional interference at the BTS. This interference causes additional power control commands to go out to all remote stations, including WCD 430, having an unstable effect.

This potential instability is stabilized by having WCD 430 control the reverse link gain of repeater 400 at a much slower rate than the power control of remote stations in repeater coverage. Essentially, sufficient time is allowed between repeater reverse link gain adjustments to allow remote stations to settle their own power control values.

In one embodiment, a power control rate for the repeater reverse link gain is set at around 80 dB/sec., which is about ten times slower than the power control rate experienced by typical CDMA type remote stations in repeater coverage. This is a conservative estimate that should be sufficient to maintain power control stability. For other types of communication signal standards such as those that are GSM or TDMA based, the power control rate appears to generally be even slower, so a power control rate for those systems would need to be designed with an appropriate value or rate.

Generally, a call will be placed from another phone, modem or WCD (as in BTS) to WCD 430 and this call should be maintained for a minimum amount of time. This time window should be sufficient to allow micro-controller 432 to adjust the gain of amplifier 422 and settle the reverse link gain to its correct operating point before the call ends. This assumes the BTS will maintain this call for a minimum of around 30 seconds, and that the repeater micro-controller will make amplification adjustments within about a 20 second window. These are conservative estimates that should be sufficient to reasonably guarantee good functionality in a typical repeater design, and can be changed accordingly.

In a commercial repeater, the micro-controller could also be used for repeater alarm monitoring, and other functions, as desired.

As mentioned above, fixed attenuator 426 is used to set how the power level a remote station in repeater coverage hits the BTS. It is desirable to have remote stations in repeater coverage initially hit the BTS at a power level below their required Eb/Nt. This ensures that the remote stations in repeater coverage will not create additional interference by hitting the BTS with excessive power. In one embodiment, the value chosen for attenuator 426 is such that the transmitted power level of a remote station in repeater coverage will hit the BTS about 5 dB below its required $E_b/N_t$. This value is selected as a closed loop adjustment factor. The remote station in repeater coverage will reach its required $E_b/N_t$ after closed loop power control engages and settles. It is assumed that the required $E_b/N_t$ for a remote station in repeater coverage is about 6 dB and that this $E_b/N_t$ corresponds to a frame error rate of around 1%, as typically required by the BTS, although other rates could easily be used, as desired. These values are chosen as a starting point and may change after empirical data is collected, since it is understood that the required Eb/Nt can change depending on conditions in the network or communication system.

As is desired for the situation where a remote station is in repeater coverage, it is likewise desirable to have WCD 430 initially hit the BTS at a power level below its required $E_b/N_t$ to ensure that the WCD will not create additional interference at the BTS. Therefore, the variable gain amplifier is set such that the transmitted power level of the repeater phone hits the BTS 10 dB below its required $E_b/N_t$, or to a closed loop adjustment factor of 10 dB. This 10 dB value is chosen to accommodate the 10 dB minimum required attenuation or margin discussed earlier. If the minimum margin of the amplifier is lowered, as may happen after or in response to the gathering of empirical data and or system testing, then the closed loop correction factor can also be lowered by the same amount.

While a variable gain amplifier 422 is shown in FIG. 4, it should be understood by those skilled in the art that other techniques are also available for effectively controlling output power. For example, a fixed gain amplifier can be used in place of amplifier 422 with a variable attenuator placed in series with the input, to adjust the amount of signal gain by adjusting the input signal power level, as mentioned above. This is illustrated in FIG. 5, where a repeater 500 is shown using many of the same elements as repeater 400 with changes made to accommodate alternative signal processing and signal coupling for the WCD.

Figure 5:
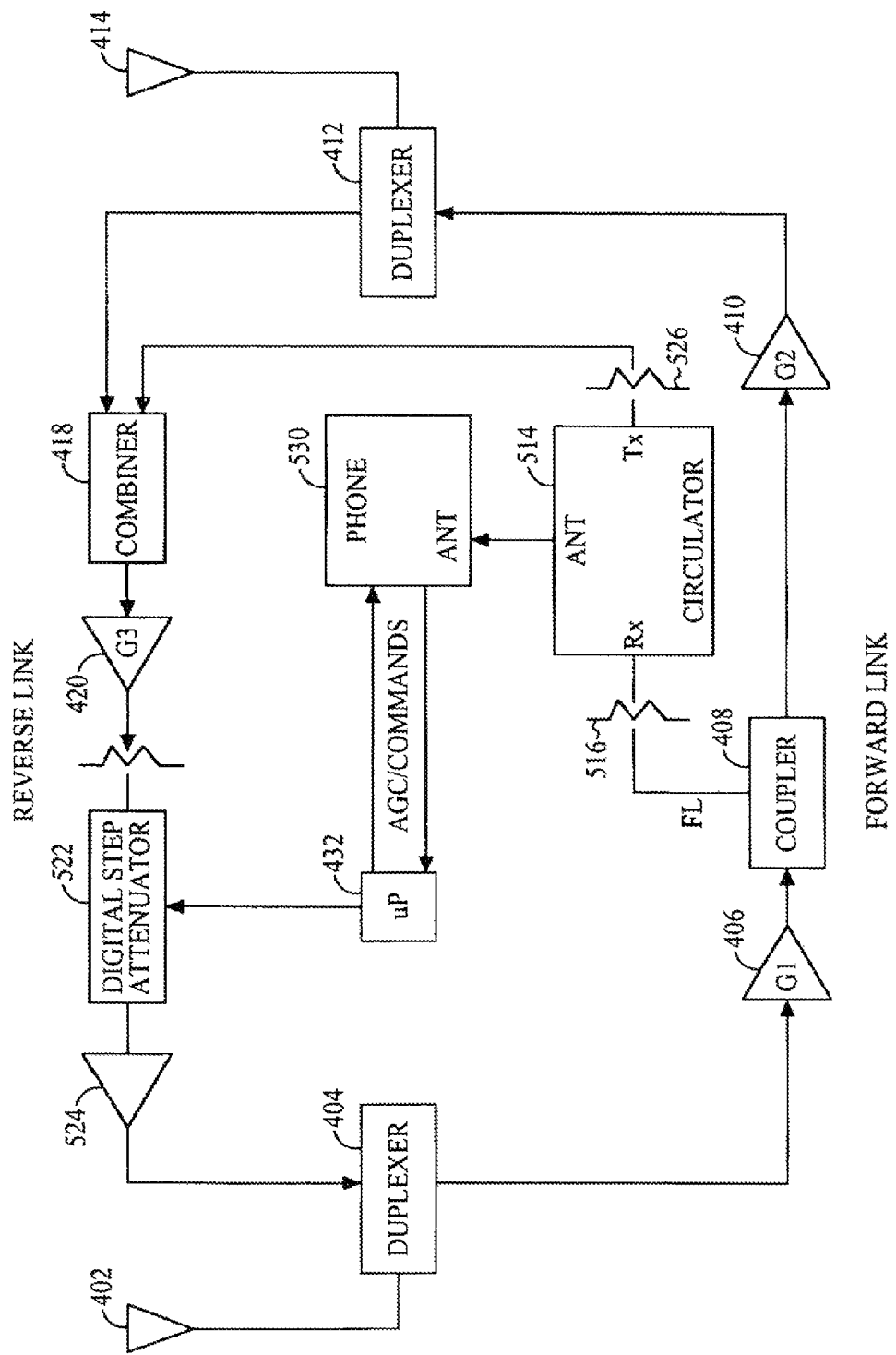
FIG. 5 illustrates another high-level repeater design using the invention.

In FIG. 5, a step attenuator 522 is used with a fixed amplifier 524 in place of variable gain amplifier 422. Control signals or commands from micro-controller 432 act to change the value of step attenuator 522 input to adjust the amount of signal gain by adjusting the input signal power level. A step attenuator such as one available from Weinschel under model number 3206-1, may be used for this function.

In addition, the repeater of FIG. 5 is configured to interact with a WCD that operates more like an independent phone, which would include circuitry for driving or transferring signals through an antenna. Here, a more complete or actual phone can be used in the repeater by using a cradle or such device to secure the phone in place and provide interconnections to external circuitry within the repeater. In this situation, although not necessary, it is more likely a separate micro-controller 432 will be used. It is also possible that alternative means of coupling signals into and out of the phone may be used.

In this alternative configuration, signals may be coupled into and out of the phone using a circulator 514 to transfer signals to and from a repeater phone 530 antenna or antenna connector, or similar input/output. A circulator such as one available from Ute Microwave under model number CT-1058-0, may be used for this function. Circulator 514. The circulator is used to split the repeater phone receive and transmit signals, and to provide isolation between these two signals. The circulator selected for this design typically has an isolation of about 20 dB, which is sufficient to ensure repeater stability.

Two attenuators 516 and 526 are also shown in FIG. 5. Attenuator 516 can be used to adjust the amount of power being transferred into circulator 514, while attenuator 526 is used to adjust the amount of power being transferred into combiner 418, in a similar manner to previously described attenuators, 416 and 426, respectively.

VIII. Typical Wireless Communications Device

Figure 6:
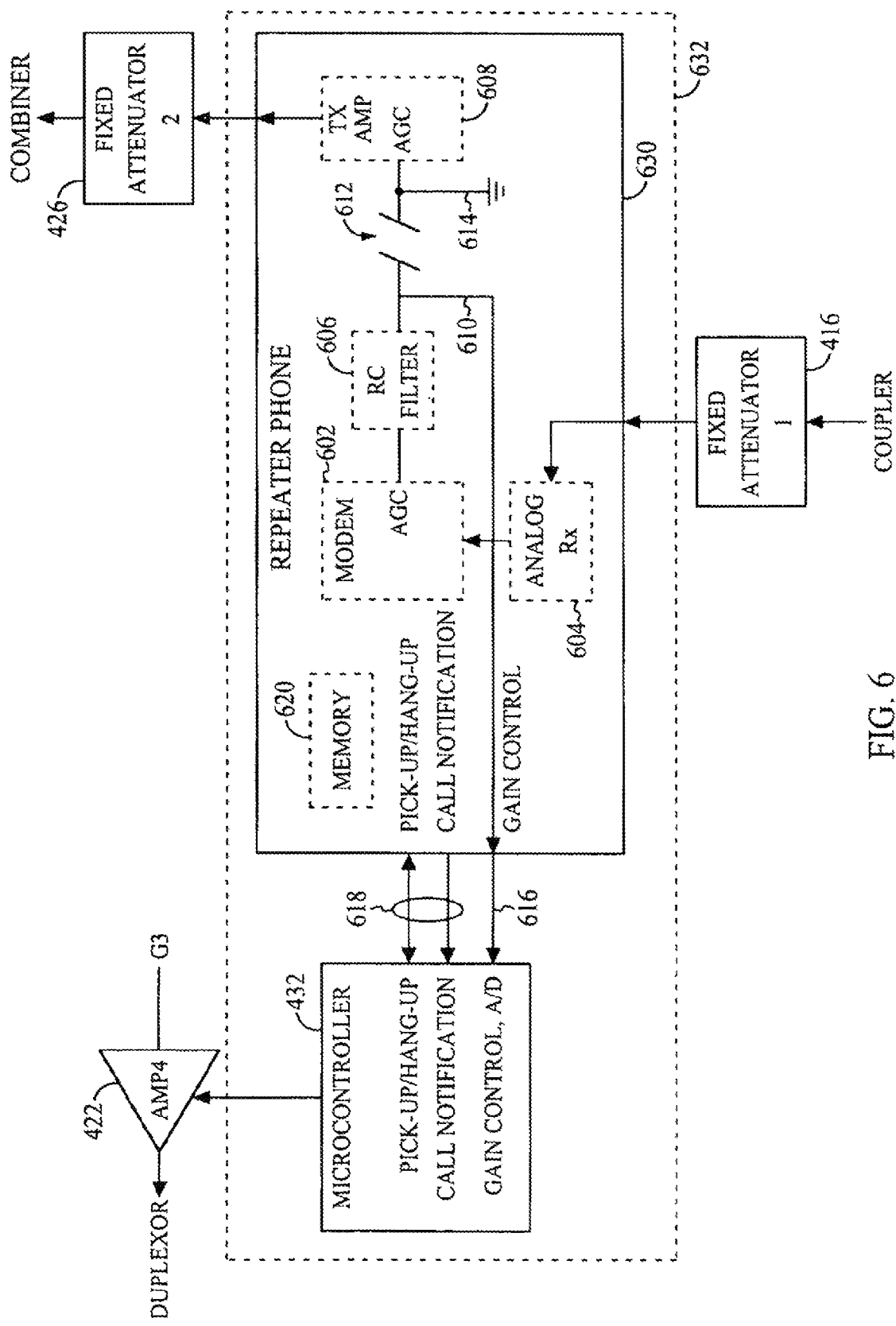
FIG. 6 illustrates one type of embedded wireless communication device.
Figure 7:
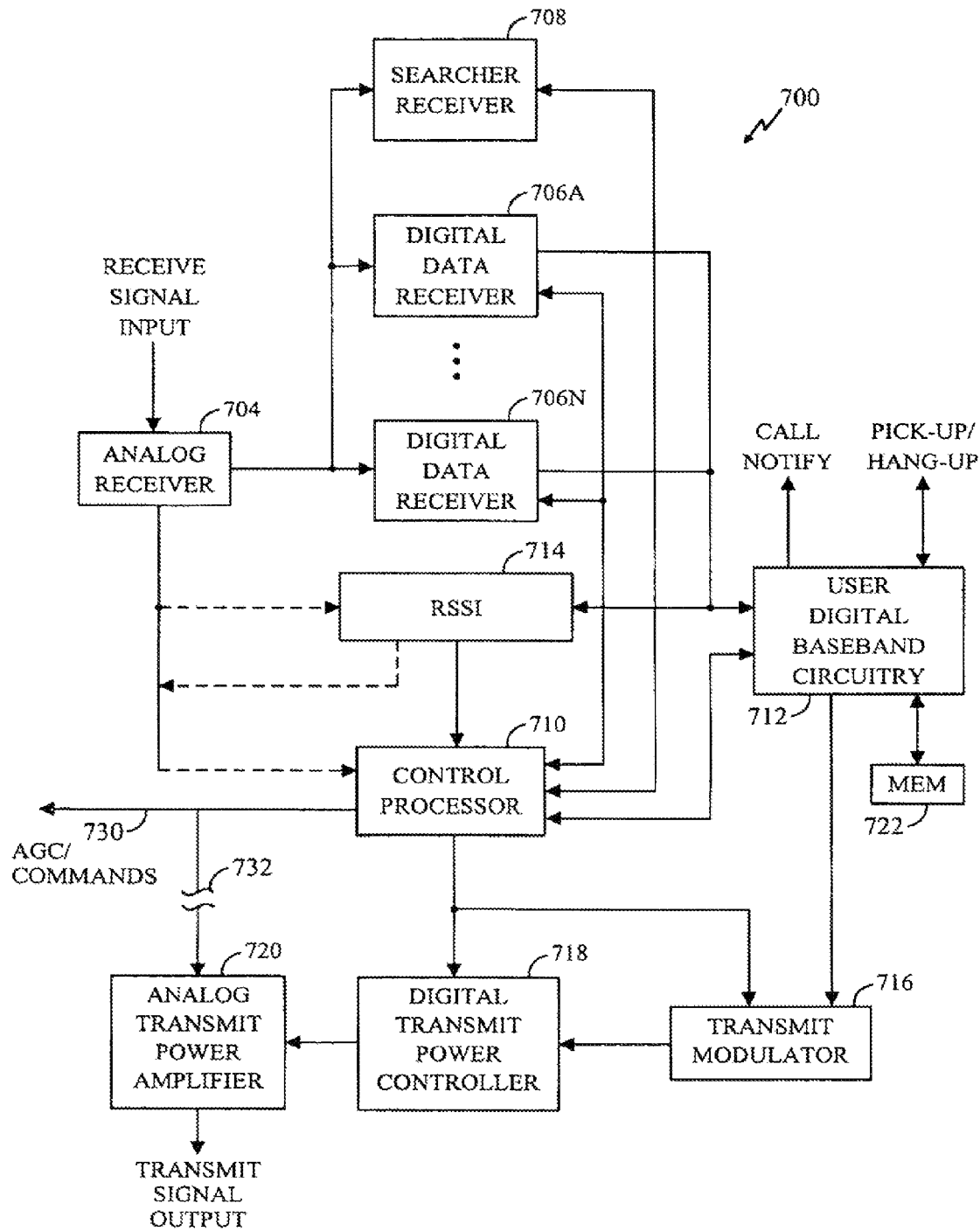
FIG. 7 illustrates another type of embedded wireless communication device.

Two typical wireless communication devices useful for implementing WCD 430 are shown in FIGS. 6 and 7.

In FIG. 6, a repeater phone 630 is shown having a modem 602 which receives input signals from an analog or digital, signal receiver 604 which is in turn connected to receive input signals from fixed attenuator 416, discussed above. An exemplary modem would be one of several well known mobile stations modems (MSM) manufactured by Qualcomm Incorporated, under model numbers such as MSM3100, MSM5xxx (5050, 5100, 5200, 5500, etc.) or 6xxx (6050, 6100, 6200, 6500, etc.) for use in CDMA phones. Repeater phone 630 also has an AGC output which is directed to a transmission power amplifier 608, typically through an RC filter 606. The AGC signal is transferred along an AGC control line 610. Control line 610 is shown in FIG. 6 as having a break 612, which is symbolic of the change that is implemented in making a phone useful for embedding in repeater 400. The AGC line is redirected to form an AGC output 616 which is transferred to micro-controller 432, as discussed above. Generally, in order to set the transmission circuitry or amplifier to a desirable minimum level of output, the input used for the AGC signal can be connected to a ground level point 614.

It should be noted that micro-controller 432 can be separate from repeater phone 630, or contained as part of repeater phone 630 if the processing power of the repeater phone has sufficient capability. For example a typical CDMA wireless device uses one or more integrated circuits that employ embedded processors that are quite powerful, and a certain amount of associated memory or program storage. For example, some embodiments may include an embedded ARM-type processor or the like. Such elements can be used to implement the functions associated with micro-controller 432 and provide a connection or signals output to control the operation of variable gain amplifiers or signal attenuators. For this reason a dashed line 632 is used to indicate that the functions or operation of micro-controller 432 are incorporated within the communication device being used.

FIG. 6 also shows the output/input lines 618 that connect to circuitry associated with or in modem 602 that provide a call notification, such as indicating the phone is "ringing", although a ringer is not generally useful in this application, and for providing signals to the modem to either "pick-up" or "hang-up" the connection for the phone. This input is provided from the microprocessor since there is no longer a series of buttons being pushed by a phone user to make these choices.

In addition, while modem 602 may contain a controller and internal memory for accommodating commands and operations described herein, one or more separate or additional memory or storage element 620 may also be included within repeater phone 630 to provide locations for storing commands, data, instructions, and so forth, as desired. Memory refers to any processor-readable medium including, but not limited to, RAM, ROM, EPROM, PROM, EEPROM, disk, floppy disk, CD-ROM, DVD, or the like, on which may be stored a series of instructions executable by a processor.

In FIG. 7, a typical spread spectrum wireless user terminal 700 is shown which uses an analog receiver 704 to receive, down-convert, amplify, and digitize received signals. Digital communication signals output by analog receiver 704 are transferred to at least one digital data receiver 706A and at least one searcher receiver 708. Additional digital data receivers 706B-706N can be used to obtain desired levels of signal diversity, depending on the acceptable level of unit complexity, as would be apparent to one skilled in the relevant art.

At least one control processor 720 is coupled to digital data receivers 706A-706N along with the searcher receiver 718, to provide, among other functions, basic signal processing, timing, power and handoff control or coordination. Another basic control function often performed by control processor 710 is the selection or manipulation of PN code sequences or orthogonal functions to be used for processing CDMA communication signal waveforms. Control processor 710 signal processing can include determination of relative signal strength and computation of various related signal parameters, which may include the use of additional or separate circuitry such as received signal strength indicator (RSSI) 714.

Outputs for digital data receivers 706A-706N are coupled to digital baseband circuitry 712 within the subscriber unit. User digital baseband circuitry 712 normally uses processing and presentation elements to transfer information to and from a terminal user, such as signal or data storage elements such as transient or long term digital memory; input and output devices such as display screens, speakers, keypad terminals, and handsets. These elements are not necessary in this application, except for field servicing perhaps. Also included is A/D elements, vocoders and other voice and analog signal processing elements that all from parts of the terminal baseband circuitry, using elements well known in the art. If diversity signal processing is employed, user digital baseband circuitry 712 can comprise a diversity combiner and decoder. Some of these elements may also operate under the control of, or in communication with, control processor 710.

In addition, while baseband circuitry 712 normally contains memory for accommodating commands and operations described herein, one or more separate or additional memory or storage elements 722 (such as discussed above) may also be included within repeater phone 700 to provide locations for storing commands, data, instructions, and so forth, as desired.

When voice or other data is prepared as an output message or communications signal originating with the subscriber unit, user digital baseband circuitry 712 is used to receive, store, process, and otherwise prepare the desired data for transmission. In the present application such data would be minimal and used simply for establishing a communication link or indicating detected signal strength. Baseband circuitry 712 provides this data to a transmit modulator 716 operating under the control of control processor 710, which has an output connected to a digital transmit power controller 718 which provides output power control to an analog transmit power amplifier 720 for final transmission. Information on the measured signal strength for received communication signals or one or more shared resource signals can be sent to the base station using a variety of techniques known in the art, for example, by appending the information to other messages prepared by baseband circuitry 712. Alternatively, the information can be inserted as predetermined control bits under control of control processor 710.

Analog receiver 704 can provide an output indicating the power or energy in received signals. Alternatively, received signal strength indication element 714 can determine this value by sampling an output of analog receiver 704 and performing processing well known in the art. In normal use this information can be used directly by transmit power amplifier 720 or transmit power controller 718 to adjust the power of transmitted signals. This information can also be used by control processor 710 to create AGC control signals for these other elements.

Digital receivers 706A-N and searcher receiver 708 are configured with signal correlation elements to demodulate and track specific signals. Searcher receiver 708 is used to search for pilot signals, while digital receivers 706A-N are used to demodulate other signals (traffic) associated with detected pilot signals. Therefore, the outputs of these units can be monitored to determine the energy in the pilot signal or other shared resource signals. Here, this is accomplished also using either signal strength indication element 714 or control processor 710.

As has already been suggested by FIGS. 4 and 5, the elements shown for the WCD's in FIGS. 6 and 7 can form part of a simple control module or device as opposed to a more complete "phone". In this case, as stated earlier, the device can be designed to accept signals within certain power ranges or amplitudes and timing, and as such the attenuator 416 or 426 may not be used, either one or both.

For the present invention, it is the ability to receive signals from a BTS, operate on or respond to those signals, and generate or use appropriate power commands or signals, which may include power up/down commands, that is important to the operation of the embedded WCD. Therefore, aside from this power control functionality being implemented by WCD 430, extraneous elements for processing other signals, such as screen displays, ring tones, music, video, etc. are not necessary to this function. In addition, when using a less complex module approach to designing WCD 430, the processor or controller used in WCD 430 is more likely to have sufficient or even extra power or processing cycles available to perform the functions of both WCD 430 and micro-controller 432, which is useful in reducing costs and complexity. In addition, memory and other elements that may be used for storing information associated with other operations, can also be released to handling power control functions.

IX. Analysis of Operation of Power Controlled Repeater

With a repeater in a BTS coverage area, under consistent loading condition, and in the absence of jammers, the reverse link $E_b/N_o$ equation, under perfect power-control, for a remote station is:

$$\frac{E_b}{N_o} = \frac{S}{\frac{(M-1)\upsilon(1+i)}{W} S + (N_{repeater}^{@BTS} + N_O^{nom})} \frac{1}{R}, \quad (19)$$

where S is the received signal power of the remote station, M is the number of users, $\upsilon$ is a voice activity factor, and i is the ratio of interference from other sectors.

If $S_R$ is defined to be the transmit power of the embedded WCD, then the $E_b/N_o$ for the embedded WCD in the power-controlled repeater is:

$$\frac{E_b}{N_o} = \frac{S_R G_T G_B}{\frac{(M-1)\upsilon(1+i)}{W} S_R G_T G_B + (N_{repeater}^{@BTS} + N_O^{nom})} \frac{1}{R}. \quad (20)$$

which in terms of the repeater thermal noise push, $P_{thermal}$, is:

$$\frac{E_b}{N_o} = \frac{S_R G_T G_B}{\frac{(M-1)\upsilon(1+i)}{W} S_R G_T G_B + N_O^{nom} P_{thermal}} \frac{1}{R}. \quad (21)$$

With a perturbation of $\gamma$ in the repeater reverse link gain (G3 and G4 in FIG. 4), both the BTS-repeater link gain and the repeater thermal noise contribution at the BTS are going to be perturbed by $\gamma$ as well. If reverse link closed-loop power-control requests a change of $\alpha$ in the transmit power of the embedded WCD to achieve the same $E_b/N_o$ as that in Equation 20, then:

$$\frac{E_b}{N_o} = \frac{(\alpha S_R)(\gamma G_T) G_B}{\frac{(M-1)\upsilon(1+i)}{W}(\alpha S_R)(\gamma G_T) G_B + (\gamma N_{repeater}^{@BTS} + N_O^{nom})} \frac{1}{R}. \quad (22)$$

From the above equations one can describe the change in repeater thermal noise push at the BTS that corresponds to the perturbation in the repeater reverse link gain. More specifically, let $\rho$ be the change in repeater thermal noise push at the BTS. Therefore:

$$N_O^{nom}(P_{thermal}\rho) = \gamma N_{repeater}^{@BTS} + N_O^{nom}, \quad (23)$$

$$P_{thermal}\rho = \frac{\gamma N_{repeater}^{@BTS}}{N_O^{nom}} = \frac{N_{repeater}^{@BTS}}{N_O^{nom}}\gamma + 1 = (P_{thermal} - 1)\gamma + 1, \quad (24)$$

$$\rho = \frac{(P_{thermal} - 1)\gamma + 1}{P_{thermal}}. \quad (25)$$

with substitution from above, one can obtain:

$$\frac{E_b}{N_o} = \frac{S_R G_T G_B(\alpha\gamma)}{\frac{(M-1)\upsilon(1+i)}{W} S_R G_T G_B(\alpha\gamma) + N_O^{nom} P_{thermal}(\rho)} \frac{1}{R}. \quad (26)$$

From Equation 26, in order to achieve the same $E_b/N_o$ as that in previous expressions under perfect power-control, it is evident that $\alpha\gamma=\rho$. Therefore:

$$\alpha\gamma = \rho = \frac{(P_{thermal} - 1)\gamma + 1}{P_{thermal}}, \text{ and } \gamma = \frac{1}{P_{thermal}(\alpha - 1) + 1}. \quad (27)$$

Figure 10:
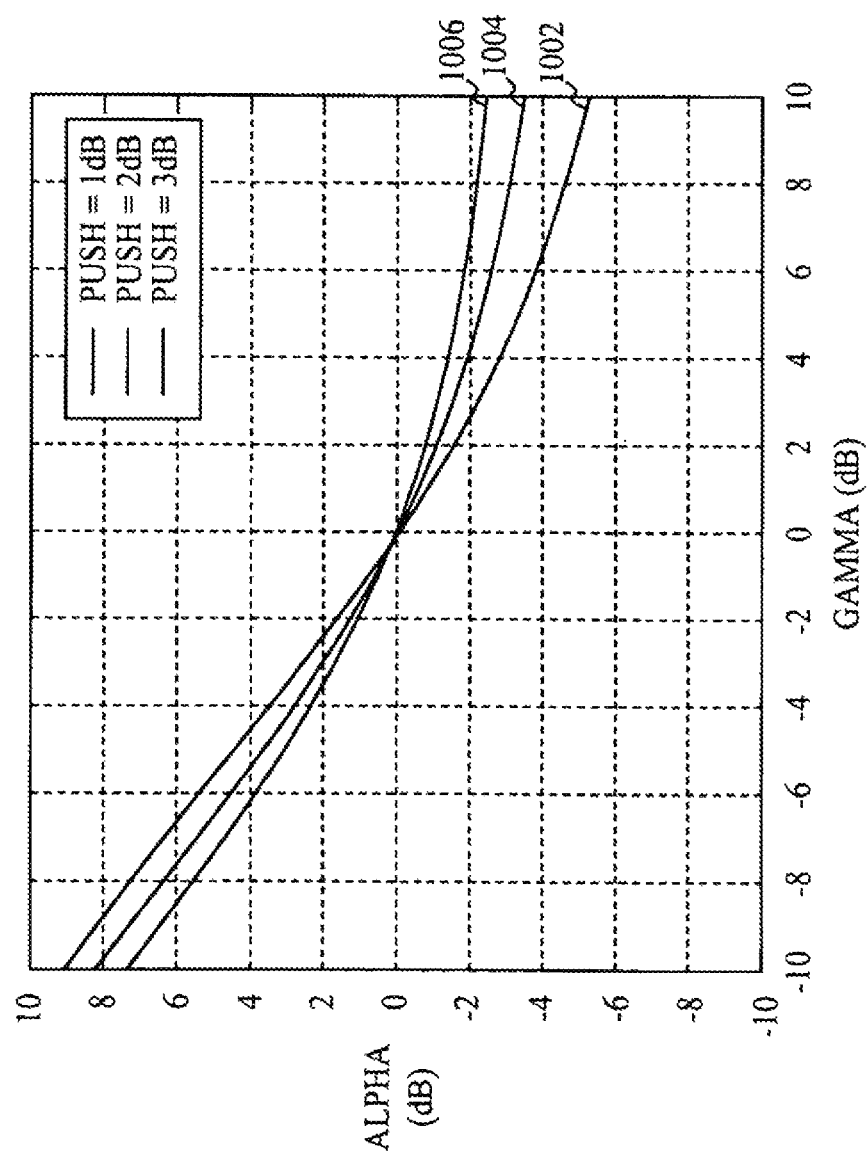
FIG. 10 illustrates a graphical representation of alpha versus gamma values for different push rates.

From Equation 27, given the nominal repeater thermal noise push at the BTS, we could estimate and offset the change in repeater reverse link gain from the change in the transmit power of the embedded WCD, and, therefore, maintain a substantially constant repeater thermal noise push at the BTS. The relationship between $\gamma$ and $\alpha$ for repeater thermal noise push at the BTS, with push values of 1, 2, and 3 dB is shown in FIG. 10, as lines 1002, 1004, and 1006, respectively.

X. Design of Power-Controlled Repeater

There are several specific issues to be considered when one designs a power-controlled repeater for a given system, using known features and parameters of the communication system with which it is to be used. These relate to forward link power amplifier output in the repeater, repeater gain, distribution of gain on the forward link, distribution of gain on the reverse link, nominal noise factor of the repeater, and distribution of gain for the embedded wireless communication device.

1. Forward Link Power Amplifier Output

The design parameters for a forward link power amplifier output are primarily driven by the size of the desired geographical coverage or service area. This output is typically expressed in terms of the maximum average power, $W_R$. However, since the instantaneous power on the forward link of the repeater can be substantially higher than $W_R$, embodiments select or set the forward link power amplifier output capability to be as high as the maximum instantaneous power of the repeater. While not strictly required, this should be done to avoid saturation, and the maximum instantaneous power is related to the maximum average power by the peak-to-average ratio in CDMA networks.

2. Repeater Gain

In calculating the gain of a repeater, one can assume that the forward link gain $G_F$ and the reverse link gain $G_R$ are substantially identical. The BTS-repeater link gain, $G_T$, is simply the ratio of the target forward link power amplifier output, $W_R$, and the power amplifier output of the BTS, $W_B$, which has a typical value of 25 W.

To derive the gain of the repeater, $G_R$, one divides $G_T$ by the gain of the repeater donor antenna, $G_d$, the target path loss between the repeater donor antenna and the base station antenna, $L_p$, and the antenna gain of the base station antenna, $G_a$. Therefore, $G_R$ can be expressed as:

$$G_R = \frac{G_T}{G_d L_p G_a} = \frac{W_R}{W_B} \frac{1}{G_d L_p G_a}. \tag{28}$$

3. Distribution of Gain on the Repeater Forward Link

From FIG. 4, in dB, the forward link gain of the power-controlled repeater can be decomposed into:

$$G_R = G1 + G2 + \text{Coupler Loss} + 2(\text{Duplexer Loss}). \tag{29}$$

In selecting the value G1 for amplifier 406, a forward link coupler (408) to the embedded WCD, and the forward link attenuator (416) for the embedded WCD, it is important to ensure that the embedded WCD receives an adequate amount of forward link overhead channel power (for use by signals such as pilot, paging, and synchronization in a CDMA system), and the minimum requirement for accomplishing this is generally on the order of −85 dBm for a CDMA type communication system, other types of systems or protocols can have different values.

4. Distribution of Repeater Gain on the Reverse Link

Since it can be safely assumed the forward link and reverse link gains are essentially identical (or enough so for the relationships to hold), the reverse link gain of the power-controlled repeater is $G_R$ as well, and, from FIG. 4, we can see that in dB, it can be decomposed into:

$$G_R = G3 + G4 + \text{Combiner Loss} + 2(\text{Duplexer Loss}). \tag{30}$$

From above, WCD 430 is going to adjust the value G4 of amplifier 422 to maintain a substantially constant repeater thermal noise push at the BTS. Theoretically, changing G4 is going to alter the nominal noise factor of the repeater, $F_R$. However, one can safely assume that $F_R$ is constant, and you can make $F_R$ essentially constant by allocating sufficient gain in amplifier 420 (G3).

Specifically, from the anticipated changes in G4 (Per WCD), and the anticipated noise factor of amplifier 422 (G4), you can calculate by how many dB the value of gain G3 should exceed the nominal G4 value in order for $F_R$ to vary less than some pre-determined amount. For example, if it is expected that G4 will change by 10 dB, and, from the anticipated noise factor of G4, it is concluded that G3 should exceed the nominal G4 by around 40 dB in order for $F_R$ to vary less than 1%, then there is a constraint of:

$$G3 = G4 + 10 \text{ dB} + 40 \text{ dB} = G4 + 50 \text{ dB}. \tag{31}$$

which means the expression for $G_R$, in dB, becomes:

$$G_R = (G4 + 50 \text{ dB}) + G4 + \text{Combiner Loss} + 2(\text{Duplexer Loss}), \text{ and}$$

$$G4 = 0.5(G_R - \text{Combiner Loss} - 2(\text{Duplexer Loss}) - 50 \text{ dB}). \tag{32}$$

Therefore, once the value for gain G4 is determined, the gain G3 can be obtained from Equation 31, noting that other values for changes in gain (G4), or how much one gain should exceed another (G3, G4) for a given variation percentage ($F_R$) would be used, as desired or needed.

5. Nominal Noise Factor of Repeater

A nominal noise factor of the repeater, $F_R$, can be derived from the constraint placed by the open-loop turn around constant, k. In CDMA communication systems, the open-loop turn around constant, k, is "hard-wired" in the wireless communication device for known reasons, and its first three terms are:

$$k = (pt)_C - 134 + (NF)_C + \ldots,$$

where:

$(pt)_C = 10 \log_{10}(W_B) =$ Maximum BTS power amplifier output (dBm), and $(NF)_C = 10 \log_{10}(F_B) =$ BTS noise figure (dB).

For a remote station in the repeater coverage area, $(pt)_C$ should be the forward link power amplifier output of the repeater, $10 \log_{10}(W_R)$. Furthermore, $(NF)_C$ should convey the effective noise figure of the repeater. However, since k is "hard-wired" in the remote station, one can set $(NF)_C$ to offset the change in $(pt)_C$. More specifically, for the remote stations in the repeater coverage area, we have $(NF)_C^{repeater}$ instead, and $$(NF)_C^{repeater} =$$
$$10 \log_{10}(F_B) + [10 \log_{10}(W_B) - 10 \log_{10}(W_R)] = 10 \log_{10}\left(F_B \frac{W_B}{W_R}\right) \text{ (dB)}$$

Therefore, to keep the "hard-wired" open-loop turn around constant, k, valid from the perspective of the remote stations in the repeater coverage area, one should consider aiming for an effective repeater noise factor of:

$$EF_R = F_B \frac{W_B}{W_R}. \tag{33}$$

which becomes:

$$EF_R = F_R + \frac{F_B}{G_T}.$$

since the BTS-repeater link gain ($G_T$) is set to the ratio of repeater forward link power amplifier output over BTS power amplifier output, this produces:

$$EF_R = F_R + \frac{F_B}{\frac{W_R}{W_B}} = F_R + F_B \frac{W_B}{W_R}. \tag{34}$$

While looking at these relationships it might appear one cannot exactly meet the condition stated in Equation 33, but they should be able establish an effective repeater noise factor that is close to the desired value if:

$$F_R \ll F_B \frac{W_B}{W_R}.$$

6. Distribution of Gain for the Embedded WCD

For the embedded WCD, the gain of its forward link path in the repeater should be equal to the gain of its reverse link path in the repeater. Specifically, the reverse link attenuator (426) of embedded WCD 430, ATT2, should be set such that:

$$G1+\text{Coupler Loss}+ATT1=ATT2+\text{Combiner Loss}+G3+G4. \quad (35)$$

XI. Deployment of Power-Controlled Repeater

Figure 8:
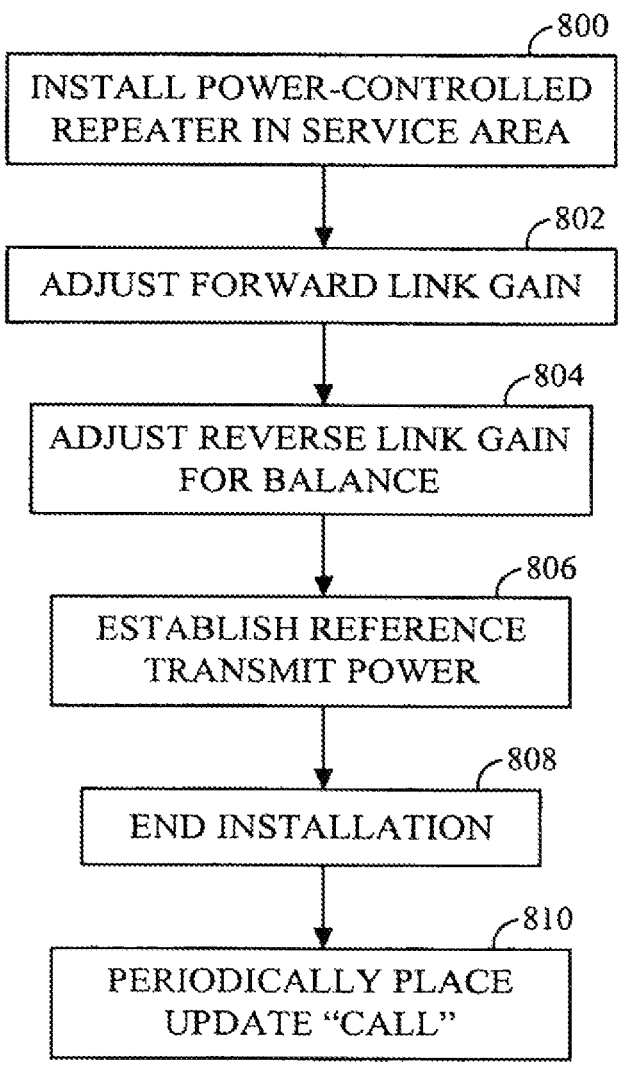
FIG. 8 illustrates steps in deploying and operating a power-controlled repeater.

The deployment of a power-controlled repeater is shown in FIG. 8, and is very similar to that of a conventional repeater, with only one extra step being involved. That extra step is to place a call on the embedded WCD to establish a reference transmit power to go with the nominal repeater thermal noise contribution at the BTS. Otherwise, as shown in FIG. 8, to deploy a power-controlled repeater, it is first physically installed or cited within a desired service area in a step 800, then the forward link gain of the repeater is adjusted in a step 802 to achieve target forward link power amplifier output, the reverse link gain of repeater or BTS is adjusted in a step 804 to balance the forward link and the reverse link, and a reference transmit power of the embedded WCD is established in a step 806. While the installation process ends in step 808, periodically a "call" maybe placed in a step 810 to a BTS to update the repeater settings based on changes in path characteristics and such.

1. Set Repeater Forward Link Power Amplifier Output

As mentioned earlier, the target repeater forward link power amplifier output, $W_R$, is driven by the size of the desired coverage area. To meet $W_R$, the value of G2 for amplifier 420 in FIG. 4 is adjusted, since the gain G1 of amplifier 406 is selected to provide adequate forward link overhead channel power to the embedded WCD 430.

2. Balance Forward Link and Reverse Link

With the forward link gain of the power-controlled repeater set, the next step is to balance the forward link and the reverse link in both the BTS and repeater coverage areas. The reverse link gain of the BTS is adjusted to accomplish this task since adjusting the reverse link gain of the repeater is going to leave the forward link and the reverse link of the BTS coverage area unbalanced.

However, if it is not generally possible to adjust the reverse link gain of the BTS, then the value of gain G3 for amplifier 420 in FIG. 4 can be adjusted to balance the links since you should keep most of the repeater's reverse link gain in the value of G4.

Once the forward link and the reverse link are balanced, the nominal repeater thermal noise push at the BTS is set as well.

3. Establish Reference Transmit Power of Embedded Subscriber Unit

From the previous section, the nominal repeater thermal noise push at the BTS is set after the forward link and the reverse link are balanced. With the nominal push in place, the last step in deployment is to place a call on the embedded phone or WCD to establish a reference transmit power to go with the nominal push.

After deployment, periodic calls can be made on the embedded WCD to detect, estimate, and offset changes in the reverse link gain of the repeater.

XII. Multi-Frequency Repeater

While the embodiments discussed above show that using a power controlled repeater achieves lower noise levels in a base station communicating with or through the repeater, additional advantages may be realized by employing multiple frequency repeaters. That is, the repeater is capable of communicating on two, or more, frequencies $f_1$ and $f_2$.

The above discussion used a single center frequency $f_1$ for signals transferred between the base station and the repeater, which is the same as the frequency being used to transfer signals between the repeater and remote stations. That is, aside from potentially splitting the forward and reverse links onto separate channels, the remote stations are configured to interact or communicate with the repeater at the same frequencies that they would use in communicating with the base station.

This is how a repeater is typically configured and makes sense where it is assumed remote stations may move into and out of cells or sectors, and may be communicating with base stations from time to time and not repeaters. There is a desire to maintain operations with remote stations somewhat uniform so that base stations and repeaters do not require additional complexity to handle communications. In addition, there is a need to see that the communication devices can be accommodated without undue change or complexity likewise being added to them.

However, if the repeater communicates with either the remote stations or the base station at a second frequency $f_2$, then the communication system may achieve improved loading or additional capacity as the remote stations handled by the repeater or the repeater itself provides lower interference to the BTS and remote stations.

By selecting a repeater structure that uses a different frequency for the repeater-to-base station link ($f_2$) than the repeater-to-remote station link ($f_1$), the embedded WCD could operate at the second frequency, $f_2$, while the power control commands for the WCD would cause both the $f_1$ and $f_2$ gain stages to change their respective gains to satisfy power control. Alternatively, the power control adjustment can be configured so that the WCD provides all the gain control using signals only at $f_1$, or at $f_2$, or some combination of the two frequencies.

In a different embodiment, if the communication system uses more than one frequency for capacity or loading, then the repeater may be wideband in nature, and pass the multiple frequency signals from the base station to the remote stations, and receive the multiple frequencies (channels) from the remote units and send these back to the base station. In this configuration, the power control commands for the WCD in the repeater may come from one of the channels, and that channel cause the gain for all channels to change in a similar fashion, or the WCD could enter a call on different channels and process the power control commands on these channels and cause the gain for all the channels to change in a similar fashion, or the WCD could enter a call on different channels and cause the gain to change for only that channel.

XIII. Multiple Repeaters

Figure 9:
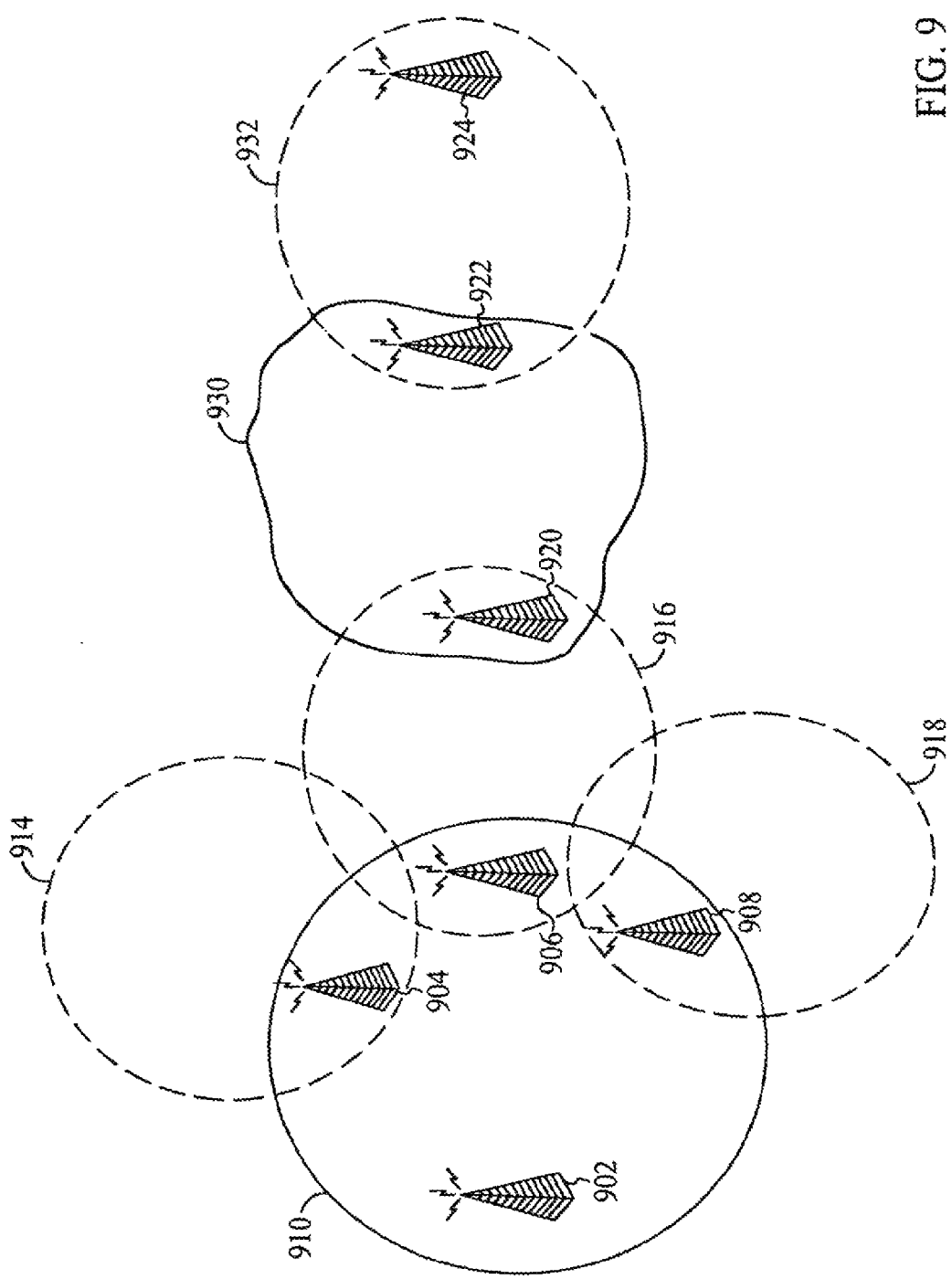
FIG. 9 illustrates an alternative use of multiple power-controlled repeaters to provide coverage for various regions.

Another manner in which the present invention can advantageously extend the reach of a communication system is through the use of more than one repeater or a chain of repeaters which communicate through each other. That is, one repeater is in communication or establishes communication links with a base station, but additional repeaters establish communication links with the first repeater, much like remote stations would. FIG. 9 illustrates a configuration for a communication system in which multiple repeaters are used that communication among each other.

As shown in FIG. 9, this concept can be extended such that one repeater can service one or more repeaters to address a broader area of coverage outside of the reach of a base station or having an unusual shape requiring additional resources. This is shown as repeater 902 with a service area 910 communicating with one or more of repeaters 904, 906 and 908, each having service areas 914, 916, 918, respectively, to provide a more complex shaped coverage area or large are of coverage.

Alternatively, a series of repeaters can be used in an "in a line" or linear fashion, each communicating with the next to extend coverage over a longer distance, but potentially narrowly confined, relatively speaking, in one dimension (width). This is shown in FIG. 9 as repeater 902 communicating with repeater 906, which in turn communicates through its service area 916 with repeater 920, which communicates with repeater 922 in service area 930, which uses service area 932 to communicate with repeater 924, and so forth. This latter technique can be used to more affectively address needs around long narrow transportation corridors for instance where communication traffic tends to be concentrated, at least during certain peak periods, or in remote or rural areas, without trying to cover lower usage areas nearby.

However, as shown by repeater 926 and service area 934, the line of repeaters can "broaden" out again, as desired, by servicing two or more repeaters at a time, rather than just one along the line. Alternatively, another line of repeaters can branch off in another direction, as it were. Therefore, once an area for which coverage is not desired or is very difficult or not possible to achieve is cleared, the service area coverage expands or is redirected.

It could also be used to link two base stations that are spaced some distance apart, by allowing the last repeater in the chain to communicate with that base station, and transfer some control or timing information between them while the repeaters are also addressing communication needs adjacent to where they are located. It is also possible to combine this with the multiple frequency allocation scheme discussed above to alter the frequencies at one or more points along the repeater chain, or area, to meet other interference needs or patterns encountered, or as desired. The communication signals intended for remote stations can have their respective signals generated or operated at one frequency while the embedded WCDs can use signals operating at a second frequency, or even a third, fourth, and so on, depending on how many repeaters are used.

In any case, it should be understood that for these multiple repeater configurations, embodiments of the invention allow each repeater to be a power-controlled repeater or not, as desired. The power-controlled repeaters take advantage of an embedded WCD and the signals being transferred from one repeater to the next to adjust power as discussed above.

XIV. Conclusion

The previous description of the embodiments above is provided to enable a person skilled in the art to make or use the present invention. While the invention has been particularly shown and described with reference to embodiments thereof, it will be understood by those skilled in the art that various changes in form and details may be made therein without departing from the spirit and scope of the invention.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or many combinations thereof. Thus, the breadth and scope of the present invention should not be limited by any of the above-described exemplary embodiments, but should be defined only in accordance with the following claims and their equivalents.

I claim:

1. A repeater comprising:
repeater circuitry comprising:
forward link circuitry configured to receive and repeat wireless signals received at the repeater from a network device, the forward link circuitry comprising at least one forward link amplifier to amplify at least a portion of the wireless signals received at the repeater from the network device;
reverse link circuitry configured to receive and repeat wireless signals received at the repeater from a mobile device for transmission to the network device, the reverse link circuitry comprising at least one reverse link amplifier to amplify at least a portion of the wireless signals received at the repeater from the mobile device; and
a control module comprising:
a mobile station modem which receives signals from the forward link circuitry through a wired connection and is configured to communicate with the network device independent of the repeated wireless signals, said wired connection comprising an attenuator to attenuate said received signals from the forward link circuitry, wherein said wired connection further comprises a coupler to transfer at least a portion of forward link power of said received signals from the forward link circuitry to the attenuator; and
a microcontroller in communication with the modem, the microcontroller configured to receive information indicative of communications between the network device and the modem, the microcontroller further configured to generate reverse link control information using the information indicative of communications between the network device and the modem.

2. The repeater of claim 1, wherein the forward link circuitry is coupled to a first duplexer and a second duplexer, and wherein the reverse link circuitry is coupled to the first duplexer and the second duplexer.

3. The repeater of claim 2, further comprising a donor antenna and a server antenna, and wherein the first duplexer is in communication with the donor antenna and the second duplexer is in communication with the server antenna.

4. The repeater of claim 1, wherein the information indicative of communications between the network device and the modem comprises information indicative of power control signals received by the modem from the network device.

5. The repeater of claim 1, wherein the information indicative of communications between the network device and the modem comprises network-based gain control information, and wherein the reverse link control information comprises reverse link gain control information.

6. The repeater of claim 5, wherein the network-based gain control information comprises power control commands and the reverse link gain control information comprises reverse link power adjustments, and wherein the microcontroller is configured to reduce the power control rate by reducing the rate of reverse link power adjustments.

7. The repeater of claim 5, wherein the reverse link circuitry includes one or more variable gain elements, and wherein the microcontroller is further configured to provide the reverse link gain control information to at least one of the one or more variable gain elements of the reverse link circuitry.

8. The repeater of claim 1, wherein the modem is included in a repeater phone embedded in the repeater.

9. The repeater of claim 1, wherein the microcontroller is configured to establish communication sessions between the modem and the network device.

10. The repeater of claim 9, wherein the microcontroller is configured to establish communication sessions between the modem and the network device periodically.

11. The repeater of claim 9, wherein the microcontroller is configured to establish communication sessions between the modem and the network device to calibrate or re-calibrate a gain of the repeater.

12. The repeater of claim 1, wherein the microcontroller is further configured to monitor alarm indications of the repeater.

13. The repeater of claim 1, wherein said wired connection further comprises a circulator to transfer said received signals from the forward link circuitry to the mobile station modem.

14. A method of controlling a repeater including a repeater phone comprising:
receiving and repeating wireless signals from a network device,
amplifying at least a portion of the wireless signals received from the network device;
receiving and repeating wireless signals received from a mobile device for transmission to the network device,
amplifying at least a portion of the wireless signals received from the mobile device; and
communicating between the repeater phone and the network device independent of the repeating wireless signals between a mobile device and a network device, wherein the repeater phone receives signals over a wired connection, said wired connection comprising an attenuator to attenuate said received signals, said wired connection coupling at least a portion of the forward link power of said received signals to the attenuator; and
controlling one or more parameters of the repeating the wireless signals between the mobile device and the network device based on the communicating between the repeater phone and the network device.

15. The method of claim 14, wherein controlling the one or more parameters of the repeating the wireless signals comprises controlling a reverse link gain of the repeater.

16. The method of claim 15, wherein the controlling the reverse link gain of the repeater comprises calibrating the reverse link gain of the repeater.

17. The method of claim 16, wherein the calibrating the reverse link gain of the repeater comprises establishing a communication between the repeater phone and the network device and generating at least one power control signal based on information related to signal power determined during a duration of the communication.

18. The method of claim 14, further comprising, in said wired connection, circulating said received signals to the repeater phone.

19. A repeater, comprising:
means for receiving and repeating wireless signals from a network device;
means for amplifying at least a portion of the wireless signals received from the network device;
means for receiving and repeating wireless signals from a mobile device for transmission to the network device;
means for amplifying at least a portion of the wireless signals received from the mobile device;
means for communicating between a repeater phone and the network device independent of the repeating wireless signals between the mobile device and the network device, wherein the repeater phone receives signals over a wired connection, said wired connection comprising means for attenuating said received signals and means for coupling at least a portion of the forward link power of said received signals to said means for attenuating; and
means for controlling one or more parameters of the repeating the wireless signals between the mobile device and the network device based on the communicating between the repeater phone and the network device.

20. The repeater of claim 19, wherein means for controlling the one or more parameters of the repeating the wireless signals further comprises means for controlling a reverse link gain of the repeater.

21. The repeater of claim 20, wherein the means for controlling the reverse link gain of the repeater further comprises means for calibrating the reverse link gain of the repeater.

22. The repeater of claim 19, wherein said wired connection further comprises means for circulating said received signals to the repeater phone.

23. A non-transitory machine-readable storage medium comprising instructions, which, when executed by a machine, cause the machine to perform operations, the instructions comprising:
instructions to receive and repeat wireless signals from a network device;
instructions to amplify at least a portion of the wireless signals received from the network device;
instructions to receive and repeat wireless signals from a mobile device for transmission to the network device;
instructions to amplify at least a portion of the wireless signals received from the mobile device;
instructions to communicate between a repeater phone and the network device independent of the repeating wireless signals between the mobile device and the network device, wherein the repeater phone receives signals over a wired connection, said wired connection comprising an attenuator to attenuate said received signals and a coupler to transfer at least a portion of forward link power of said received signals to the attenuator; and
instructions to control one or more parameters of the repeating the wireless signals between the mobile device and the network device based on the communicating between the repeater phone and the network device.

24. The non-transitory machine-readable storage medium of claim 23, wherein said wired connection further comprises a circulator to transfer said received signals to the repeater phone.

* * * * *